United States Patent
Nishimoto (12)

(10) Patent No.: US 6,442,123 B1
(45) Date of Patent: Aug. 27, 2002

(54) OPTICAL INFORMATION STORAGE DEVICE CAPABLE OF GIVING OPTIMUM PHASE COMPENSATIONS ACCORDING TO RECORDING TRACKS IN REPRODUCING INFORMATION

(75) Inventor: Hideki Nishimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/426,175

(22) Filed: Oct. 22, 1999

(30) Foreign Application Priority Data

Mar. 25, 1999 (JP) .......................................... 11-081003

(51) Int. Cl.[7] ................................................ G11B 7/00
(52) U.S. Cl. ................................. 369/112.01; 369/53.2
(58) Field of Search ........................... 369/44.23, 44.24, 369/44.25, 44.26, 44.32, 53.12, 53.2, 112.01, 112.02, 112.22, 112.28, 117, 119

(56) References Cited

U.S. PATENT DOCUMENTS

| | | | |
|---|---|---|---|
| 6,091,693 A | * | 7/2000 | Morimoto ............ 369/44.26 X |
| 6,118,748 A | * | 9/2000 | Morimoto ............ 369/44.24 X |

FOREIGN PATENT DOCUMENTS

| | | |
|---|---|---|
| JP | 8221838 | 8/1996 |
| JP | 9128825 | 5/1997 |
| JP | 9161347 | 6/1997 |
| JP | 9282730 | 10/1997 |
| JP | 9282733 | 10/1997 |
| JP | 10064135 | 3/1998 |
| JP | 10134444 | 5/1998 |

\* cited by examiner

*Primary Examiner*—Paul W. Huber
(74) *Attorney, Agent, or Firm*—Greer, Burns & Crain, Ltd.

(57) ABSTRACT

An optical information storage device for directing an incident light beam onto a recording medium having a recording surface composed of lands and grooves as tracks and detecting a reproduced signal from a reflected light beam from the recording medium. The optical information storage device includes a phase plate provided in an optical path of the reflected light beam so as to be tiltable between a first position where the phase plate gives to the reflected light beam a first phase compensation amount required for detection of signals from the lands and a second position where the phase plate gives to the reflected light beam a second phase compensation amount required for detection of signals from the grooves; and a drive mechanism for tilting the phase plate. Examples of the drive mechanism include a solenoid, DC motor, and voice coil motor.

17 Claims, 28 Drawing Sheets

OPTICAL INFORMATION STORAGE DEVICE CAPABLE OF GIVING OPTIMUM PHASE COMPENSATIONS ACCORDING TO RECORDING TRACKS IN REPRODUCING INFORMATION

BACKGROUND OF THE INVENTION

1. Field of the Invention

The present invention relates generally to an optical information storage device, and more particularly to an optical information recording and reproducing device for recording optical signals on both lands and grooves formed on a recording medium and reproducing the recorded optical signals from the recording medium.

2. Description of the Related Art

An optical disk has received attention as a memory medium that becomes a core in the recent rapid development of multimedia, and it is usually accommodated in a cartridge case to be provided as an optical disk cartridge for practical use. The optical disk cartridge is loaded into an optical disk drive to perform reading/writing of data (information) from/into the optical disk by means of an optical pickup (optical head).

A recent optical disk drive intended to realize size reduction is composed of a fixed optical assembly including a laser diode module, a polarization beam splitter for reflecting and transmitting a laser beam, and a photodetector for receiving reflected light from an optical disk, and a movable optical assembly including a carriage and an optical head having an objective lens and a beam raising mirror mounted on the carriage. The carriage is movable in the radial direction of the optical disk along a pair of rails by means of a voice coil motor.

A write-power laser beam emitted from the laser diode module of the fixed optical assembly is first collimated by a collimator lens, next transmitted by the polarization beam splitter, next reflected by the beam raising mirror of the optical head, and finally focused on the optical disk by the objective lens, thereby writing data onto the optical disk. On the other hand, data reading is performed by directing a read-power laser beam onto the optical disk. Reflected light from the optical disk is first collimated by the objective lens, next reflected by the polarization beam splitter, and finally detected by the photodetector, thereby converting the detected optical signal into an electrical signal.

A plurality of grooves are formed on a substrate of the optical disk in a concentric or spiral fashion to guide a laser beam to be directed onto the substrate. A flat portion defined between any adjacent ones of the grooves is called a land. In a general optical disk in the prior art, either the lands or the grooves are used as recording tracks on which information is recorded. However, a recent important technical subject to be considered is to increase a recording density by using both the lands and the grooves as the recording tracks to thereby decrease a track pitch. In this respect, various methods for realizing this subject have already been proposed.

In a magneto-optical disk drive as a kind of optical disk drive, a magneto-optical signal recorded on a magneto-optical disk is reproduced by directing a read-power laser beam onto the magneto-optical disk and differentially detecting a P-polarized light component and an S-polarized light component of reflected light from the magneto-optical disk by a method well known in the art. In this manner, the magneto-optical signal must be optimally reproduced by differentially detecting the P-polarized light component and the S-polarized light component of the reflected light. However, individual magneto-optical disk drives have differences in characteristics of their optical components, causing a phase difference between the P-polarized light component and the S-polarized light component of the reflected light in each magneto-optical disk drive. Further, a difference in kind between recording media also causes a similar phase difference.

FIG. 1 is a graph showing the relation between phase difference and carrier-to-noise ratio (CNR) in a 640-MB (megabytes) magneto-optical disk and in a 1.3-GB (gigabytes) magneto-optical disk. As apparent from FIG. 1, a phase difference giving a maximum value of the CNR is present in each of the 640-MB magneto-optical disk and the 1.3-GB magneto-optical disk. While the graph of FIG. 1 further shows that the CNR in the 1.3-GB magneto-optical disk higher in recording density is more insensitive to the phase difference, the 1.3-GB magneto-optical disk has a problem that the magneto-optical signal (MO signal) is largely undulated.

FIG. 2 is a graph showing the relation between phase difference and MO undulation/MO amplitude in a 640-MB magneto-optical disk and in a 1.3-GB magneto-optical disk. The MO undulation means that the envelope of an MO signal in one revolution of the disk is undulated. Such MO undulation is shown in FIG. 3. The MO undulation causes a deterioration in jitter in cutting an MO signal at a certain slice level. As apparent from FIG. 2, the MO undulation in the 1.3-GB magneto-optical disk steeply changes with a change in phase difference. Accordingly, the phase difference must be adjusted to obtain an optimum reproduced signal quality.

Further, in a magneto-optical disk drive for recording information on both the lands and the grooves of a recording medium, the width of each track is smaller than the diameter of a beam spot to be formed on the recording medium, so that the track covered by the beam spot is largely influenced by crosstalk from the adjacent track. Thus, such a land/groove recording method has a problem such that an undesirable light component reflected from any adjacent groove or land is increased to cause an associated phase difference, and a resultant change in polarization state of reproduced light. As a result, information cannot be well reproduced from the magneto-optical recording medium.

FIG. 4 is a graph showing the relation between phase difference and CNR in performing land reproduction and groove reproduction. As apparent from FIG. 4, the CNR changes with a change in phase difference in each of land reading and groove reading, and an optimum phase difference giving a maximum CNR is present in each case. Accordingly, it is necessary to perform phase compensation of polarized light components of reproduced light in each of land reading and groove reading, thereby obtaining an optimum phase difference between the P-polarized light component and the S-polarized light component. For example, Japanese Patent Laid-open Nos. 9-282730, 9-282733, and 10-134444 disclose techniques for switching a phase difference between polarized light components of reproduced light between in land reproduction and in groove reproduction. However, each technique employs a complex optical system.

SUMMARY OF THE INVENTION

It is therefore an object of the present invention to provide an optical information storage device which can reproduce information well by providing different phase compensation amounts for land reading and groove reading with a relatively simple and inexpensive optical system.

In accordance with an aspect of the present invention, there is provided an optical information storage device for directing an incident light beam onto a recording medium having a recording surface composed of lands and grooves as tracks and detecting a reproduced signal from a reflected light beam from said recording medium, comprising a phase plate provided in an optical path of said reflected light beam so as to be tiltable between a first position where said phase plate gives to said reflected light beam a first phase compensation amount required for detection of signals from said lands and a second position where said phase plate gives to said reflected light beam a second phase compensation amount required for detection of signals from said grooves; and drive means for tilting said phase plate.

Preferably, the optical information storage device further comprises control means for supplying a first control signal to said drive means to tilt said phase plate to said first position when said lands are selected as said tracks, and for supplying a second control signal to said drive means to tilt said phase plate to said second position when said grooves are selected as said tracks.

The phase plate is fixed to a housing. The housing is pivotably moved by the drive means. Examples of the drive means include a solenoid, reversible DC motor, and voice coil motor. A first stopper and a second stopper are provided to stop the phase plate at the first position and the second position, respectively. Preferably, the first stopper and the second stopper are adjustable.

In the case of adopting a reversible DC motor as the drive means, a third position between the first position and the second position can be detected by the combination of a magnet and a Hall element. In the case of adopting a voice coil motor as the drive means, the phase plate can be stopped at an arbitrary position between the first position and the second position, so that a desired phase difference can be easily realized. Accordingly, even in the case that the adjustment is not carried out in assembling the device, an arbitrary phase difference can be realized after assembling the device.

In accordance with another aspect of the present invention, there is provided an optical information storage device comprising a housing having a base; an optical recording medium rotatably accommodated in said housing and having a recording surface composed of lands and grooves as tracks; a light source mounted on said base; an optical head having an objective lens for focusing an incident light beam emitted from said light source onto said recording surface of said optical recording medium; a photodetector mounted on said base for detecting a reproduced signal from a reflected light beam from said optical recording medium; a phase plate provided in an optical path of said reflected light beam so as to be tiltable between a first position where said phase plate gives to said reflected light beam a first phase compensation amount required for detection of signals from said lands and a second position where said phase plate gives to said reflected light beam a second phase compensation amount required for detection of signals from said grooves; and drive means for tilting said phase plate.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
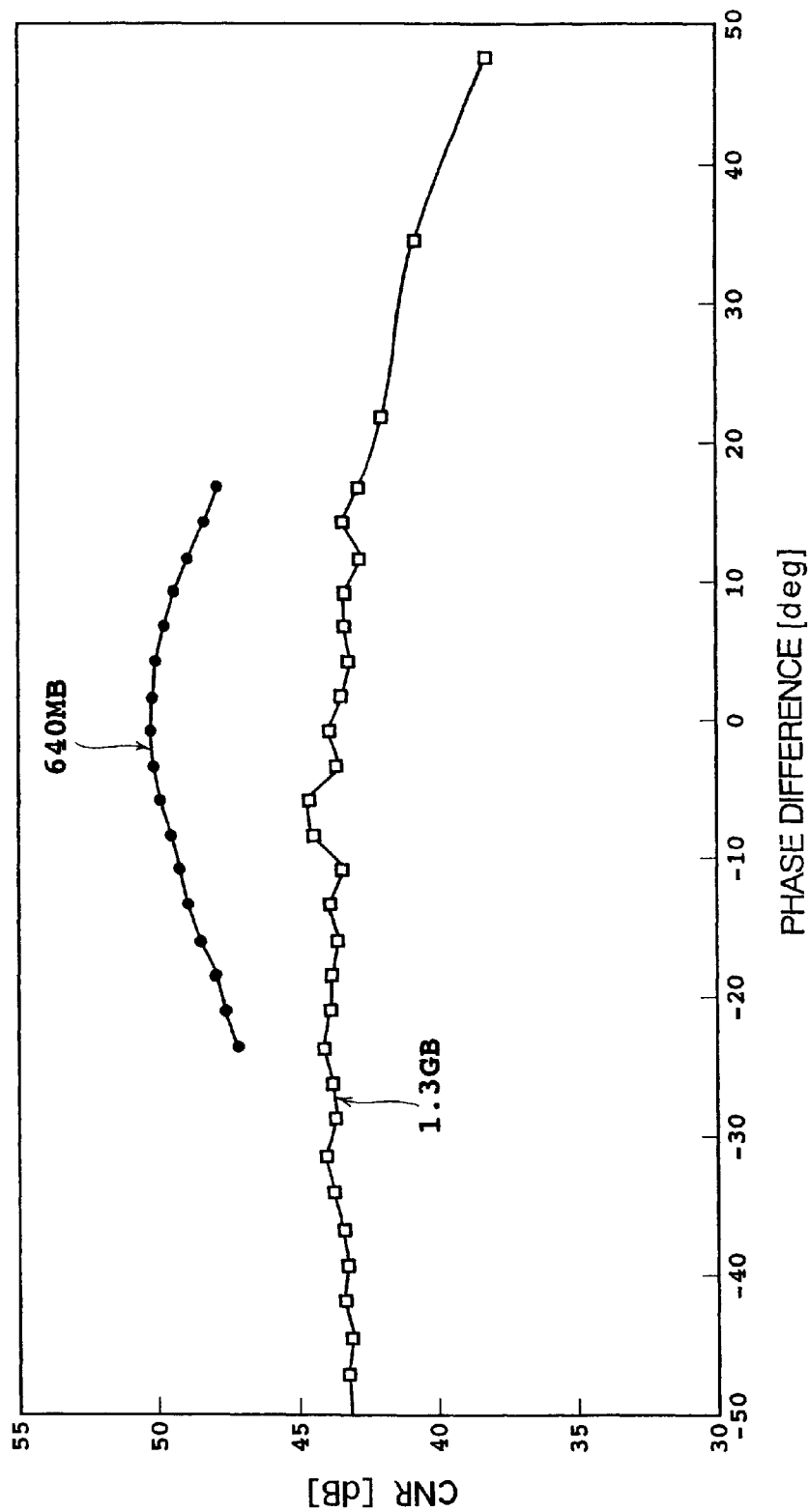
FIG. 1 is a graph showing the relation between phase difference and CNR in a 640-MB magneto-optical disk and in a 1.3-GB magneto-optical disk.
Figure 2:
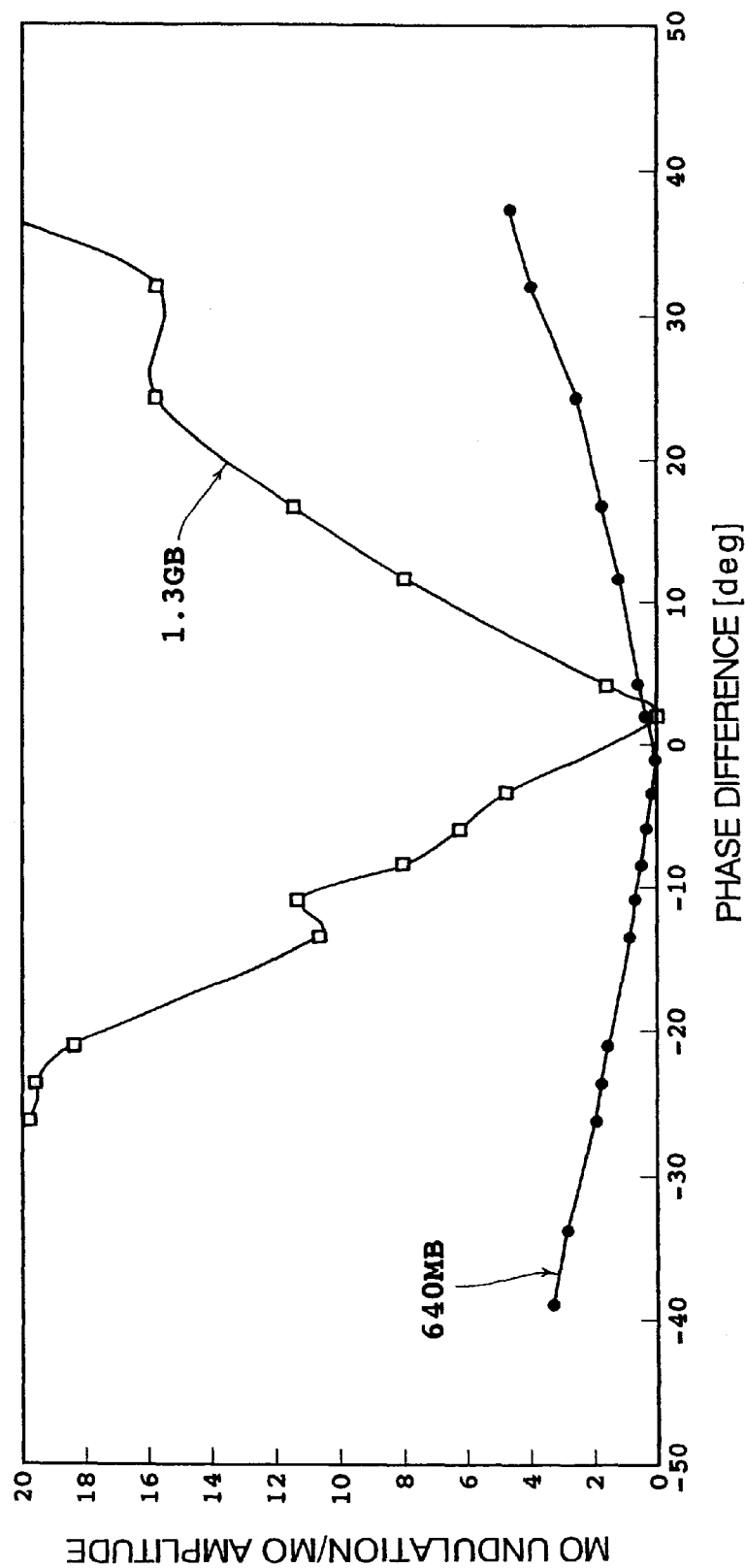
FIG. 2 is a graph showing the relation between phase difference and MO undulation/MO amplitude in a 640-MB magneto-optical disk and in a 1.3-GB magneto-optical disk.
Figure 3:
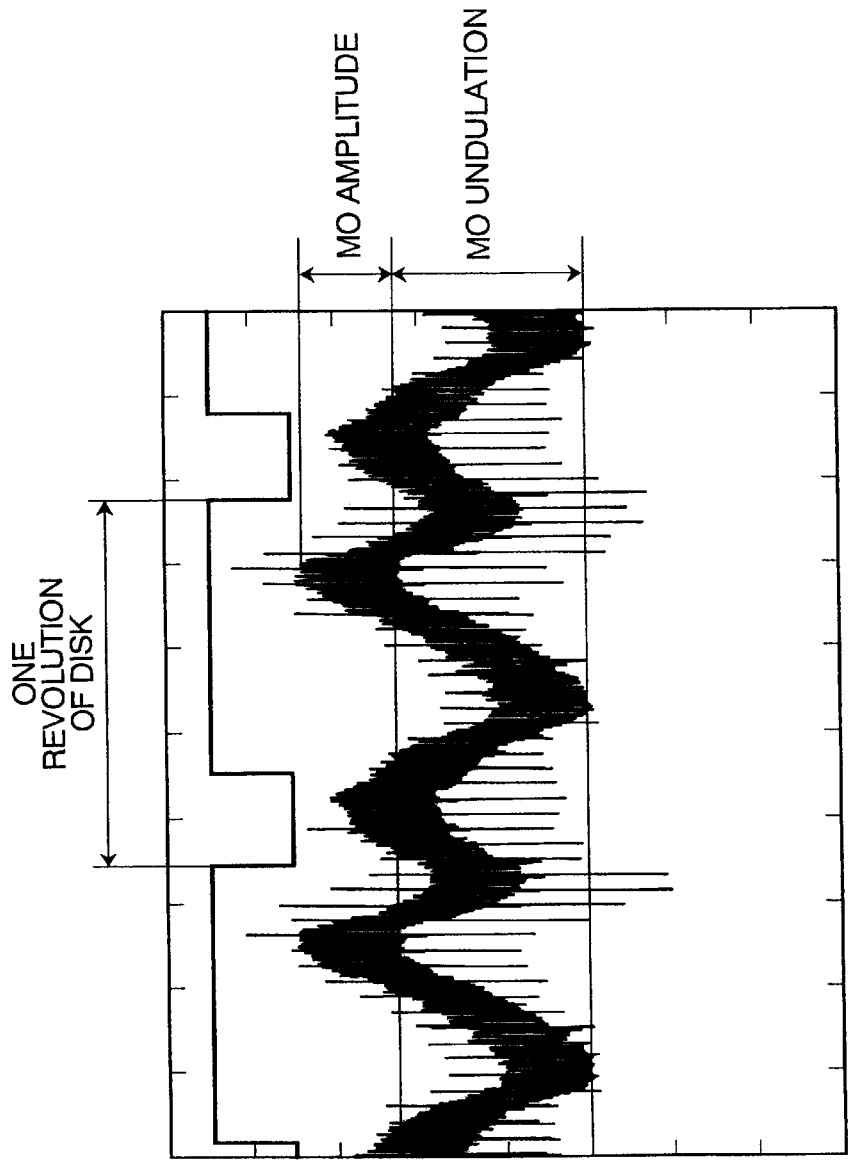
FIG. 3 is an illustration of MO undulation.
Figure 4:
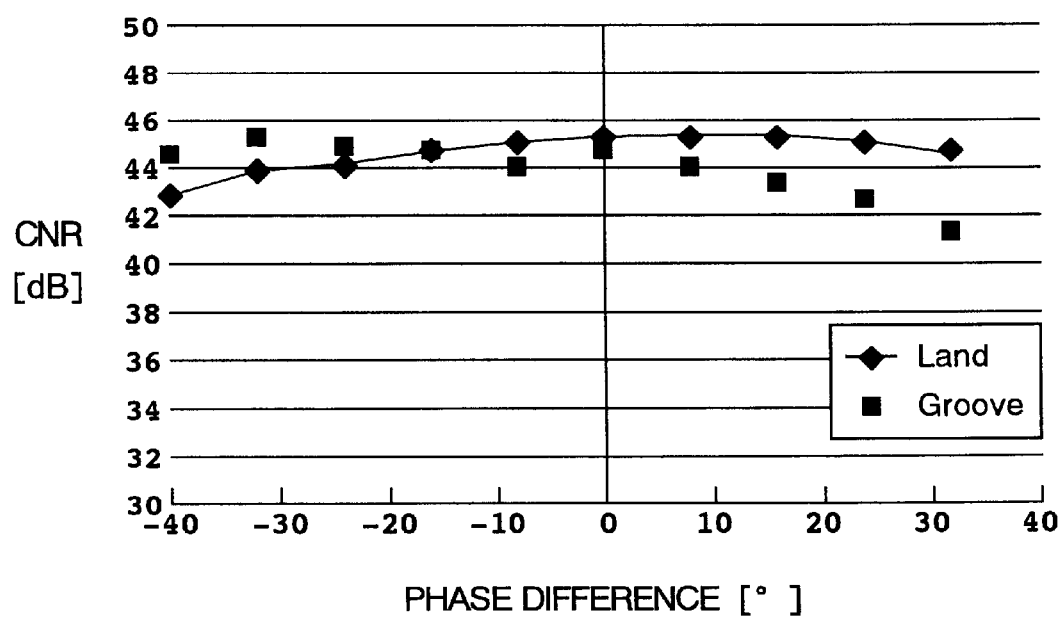
FIG. 4 is a graph showing the relation between phase difference and CNR in performing land track reading and groove track reading.
Figure 5:
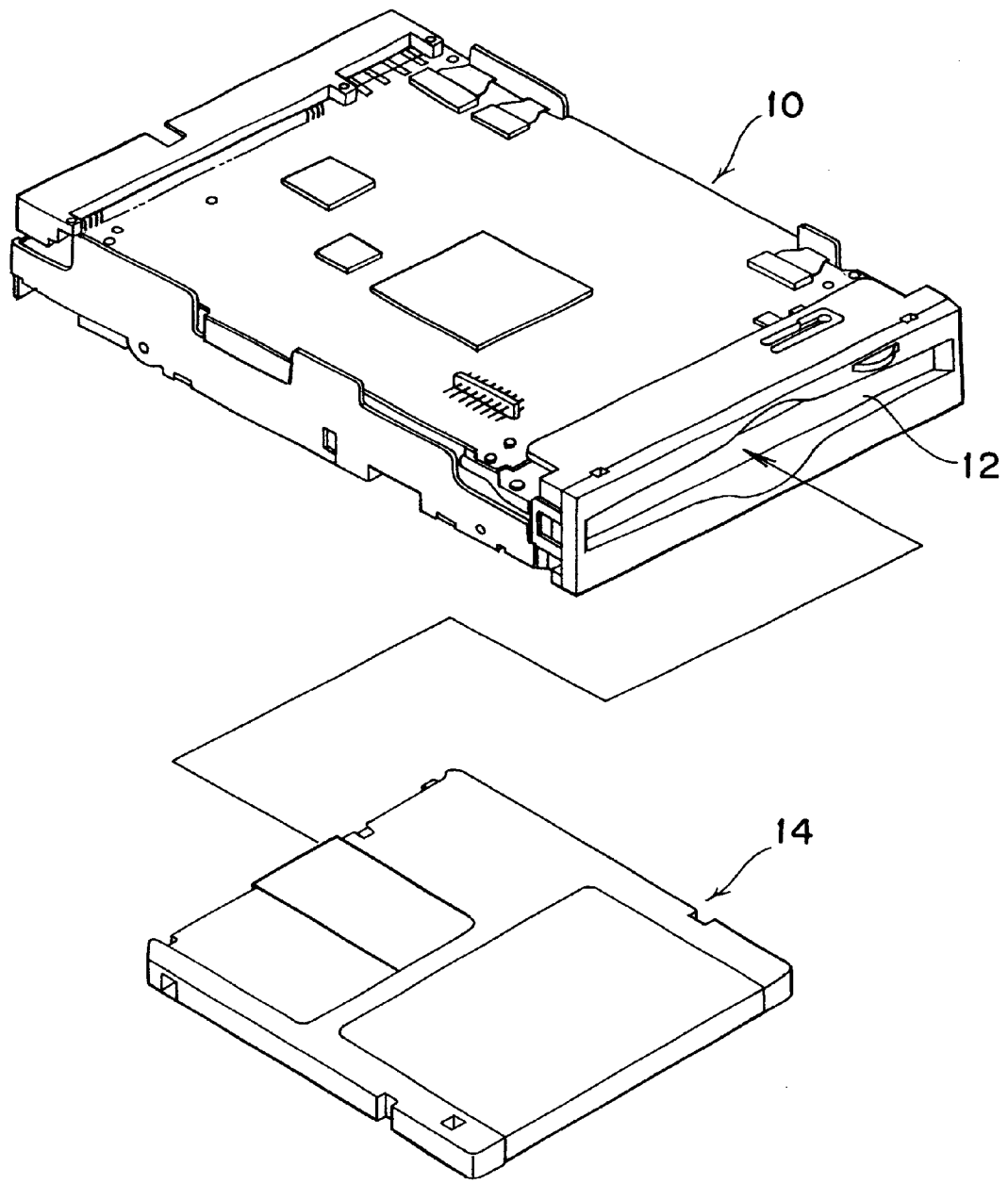
FIG. 5 is an upper perspective view of a magneto-optical disk drive including a phase compensation unit according to the present invention.
Figure 6:
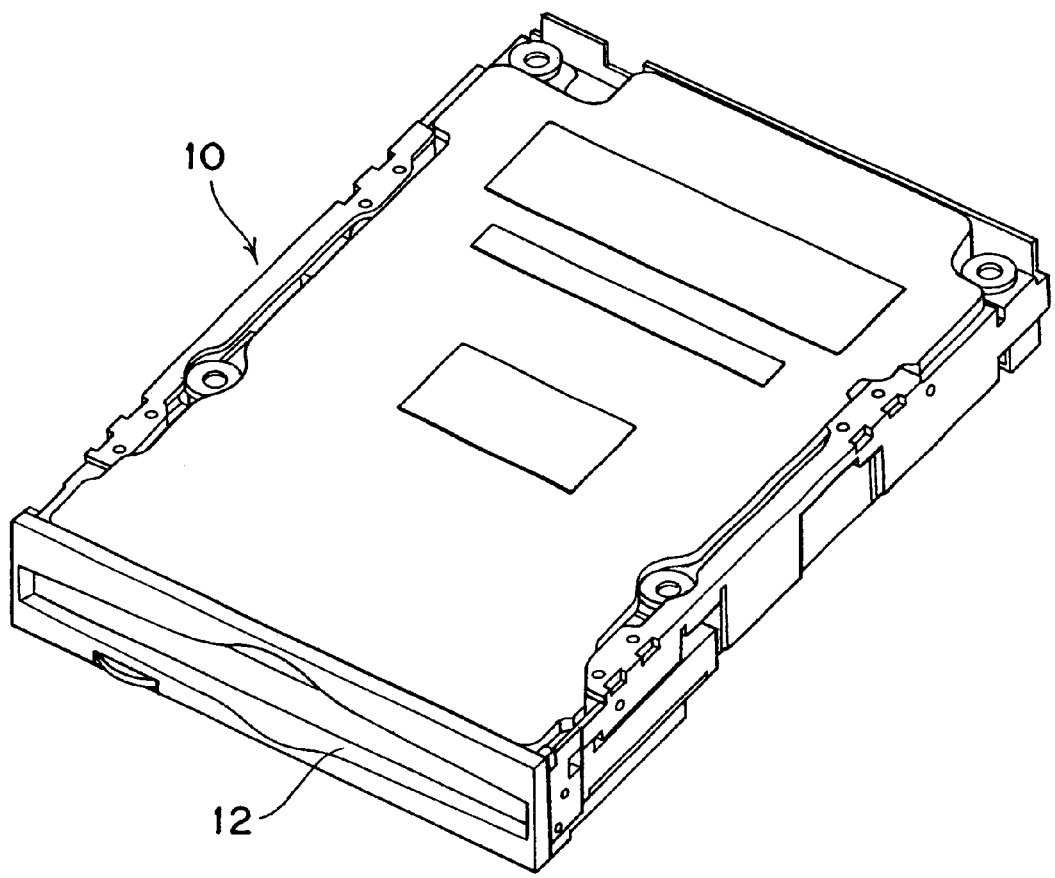
FIG. 6 is a lower perspective view of the magneto-optical disk drive.

Referring to FIG. 5, there is shown a perspective view of a magneto-optical disk drive 10 including a phase compensation mechanism according to the present invention, as viewed from the upper side. FIG. 6 is a perspective view of the magneto-optical disk drive 10 as viewed from the lower side. The magneto-optical disk drive 10 accepts a magneto-optical disk cartridge 14 having a cartridge case and a magneto-optical disk rotatably accommodated in the cartridge case, and performs reading/writing of information from/into the magneto-optical disk of the magneto-optical disk cartridge 14.

As will be hereinafter described in detail, the magneto-optical disk drive 10 includes a load/eject mechanism for the magneto-optical disk cartridge 14, a spindle motor for rotating the magneto-optical disk, a bias magnetic field generating mechanism, a positioner, an optical head, and a fixed optical unit. The magneto-optical disk drive 10 further has an insert opening 12 for accepting the magneto-optical disk cartridge 14.

Figure 7:
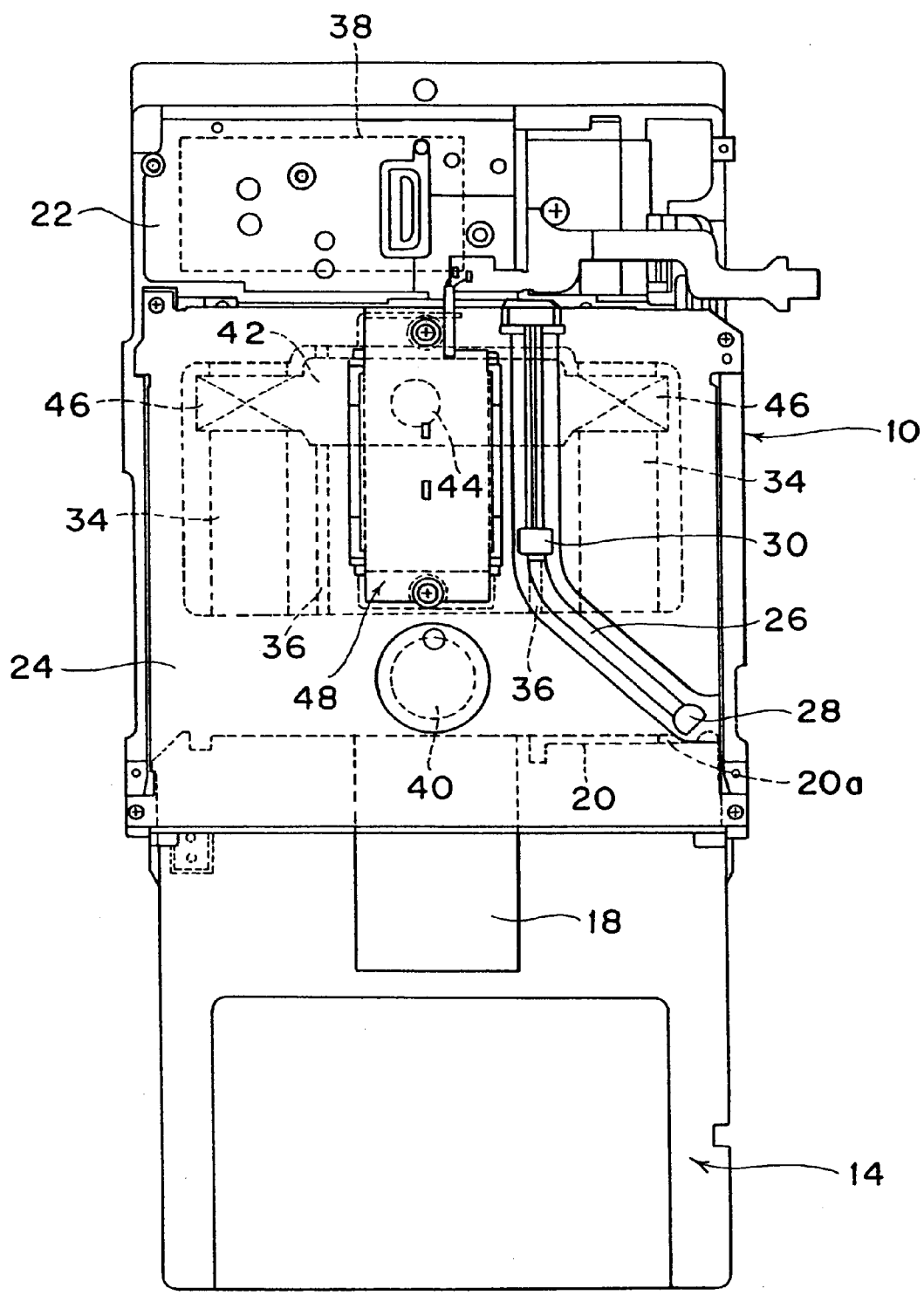
FIG. 7 is a plan view showing a condition where a magneto-optical disk cartridge is slightly inserted in the magneto-optical disk drive.

FIG. 7 is a plan view showing a condition where the magneto-optical disk cartridge 14 is slightly inserted in the magneto-optical disk drive 10 from the insert opening 12. Reference numeral 22 denotes a drive base of the magneto-optical disk drive 10. A cartridge holder 24 for holding the magneto-optical disk cartridge 14 inserted into the magneto-optical disk drive 10 is mounted on the drive base 22. The cartridge holder 24 is formed with a guide groove 26. The guide groove 26 is composed of a first portion obliquely extending from one end of the insert opening 12 (FIG. 5) laterally inward of the cartridge holder 24 and a second portion extending from an inward end of the first portion to the rear end of the cartridge holder 24 in parallel to the longitudinal direction of the magneto-optical disk drive 10. A first slider 28 and a second slider 30 are slidably engaged with the guide groove 26. The second slider 30 is connected to the first slider 28 by a spring (not shown), so that when the first slider 28 is moved inward of the cartridge holder 24 along the guide groove 26, the second slider 30 is moved through this spring to the rear end of the cartridge holder 24 along the guide groove 26.

When the magneto-optical disk cartridge 14 is inserted from the insert opening 12 into the magneto-optical disk drive 10, the first slider 28 comes into abutment against an end portion 20a of a shutter opening arm 20 mounted to a shutter 18 of the magneto-optical disk cartridge 14. During further insertion of the magneto-optical disk cartridge 14 into the magneto-optical disk drive 10, the first slider 28 is moved along the guide groove 26 inward of the cartridge holder 24 to push the shutter opening arm 20, thereby opening the shutter 18.

Further mounted on the drive base 22 are a pair of magnetic circuits 34, a pair of guide rails 36, a fixed optical unit 38 having a semiconductor laser and a photodetector, and a spindle motor 40. Reference numeral 42 denotes a carriage for carrying an optical head 44 having an objective lens. The carriage 42 is provided with a pair of coils 46 at opposite positions respectively corresponding to the pair of magnetic circuits 34. The magnetic circuits 34 and the coils 46 constitute a voice coil motor (VCM). When a current is passed through the coils 46, the carriage 42 is guided by the pair of guide rails 36 to move in the radial direction of a magneto-optical disk 16. Reference numeral 48 denotes a bias magnetic field generating mechanism mounted on the cartridge holder 24 so as to cover a range of movement of the optical head 44.

Figure 8:
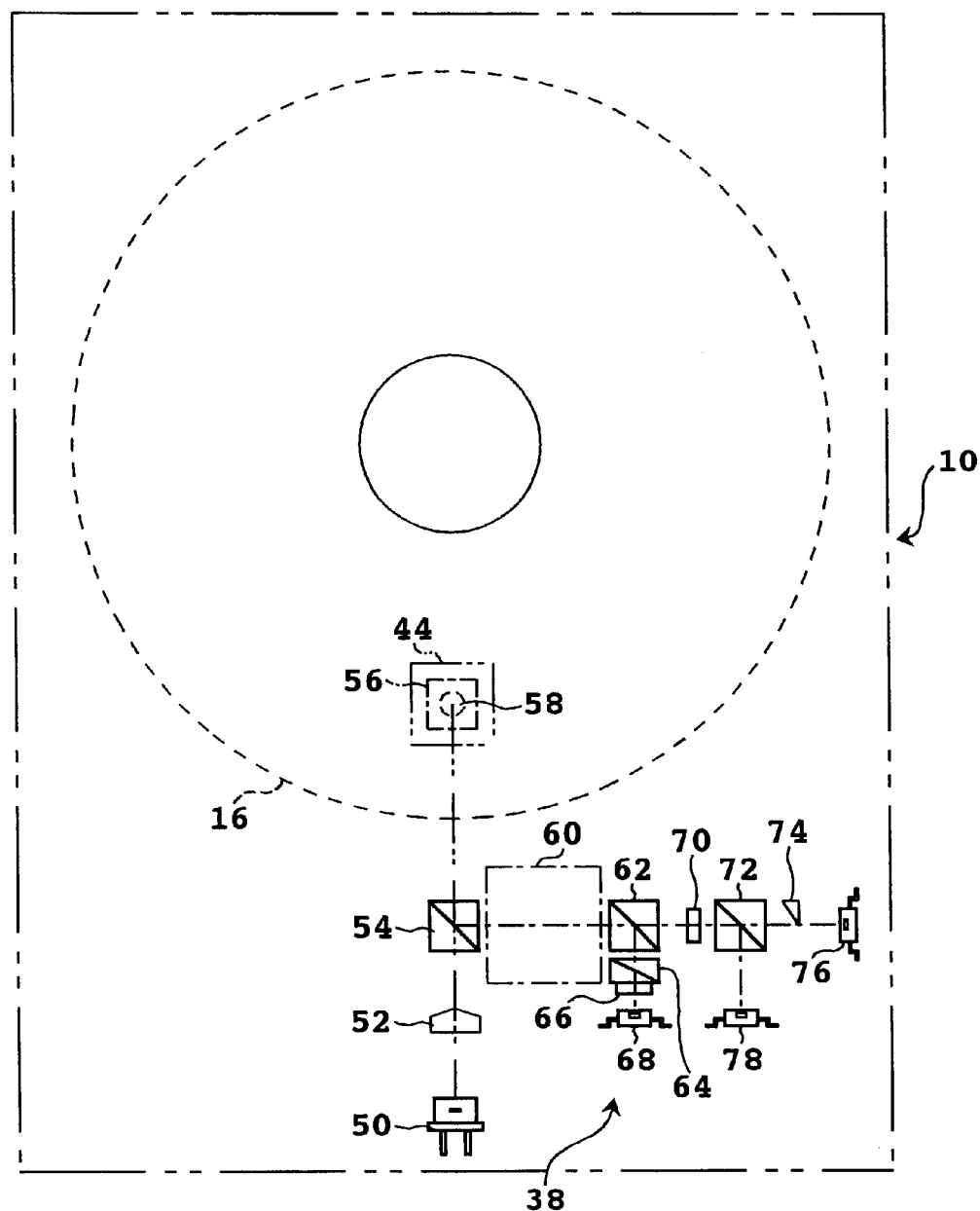
FIG. 8 is a plan view of an optical system in the magneto-optical disk drive.
Figure 9:
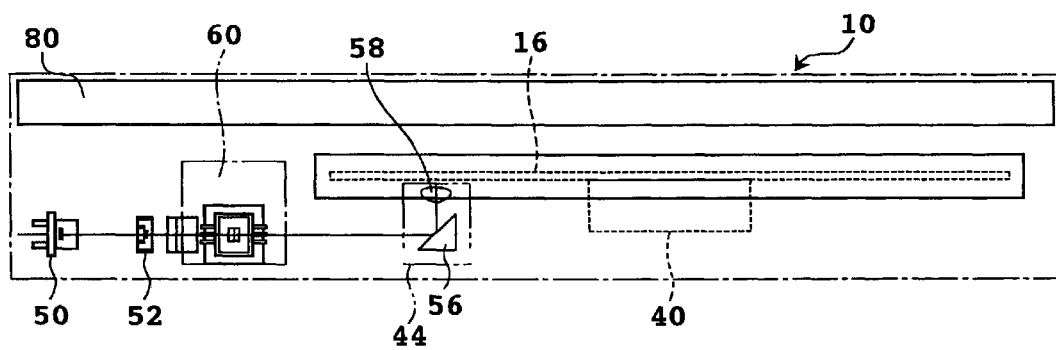
FIG. 9 is a right side view of FIG. 8.
Figure 10:
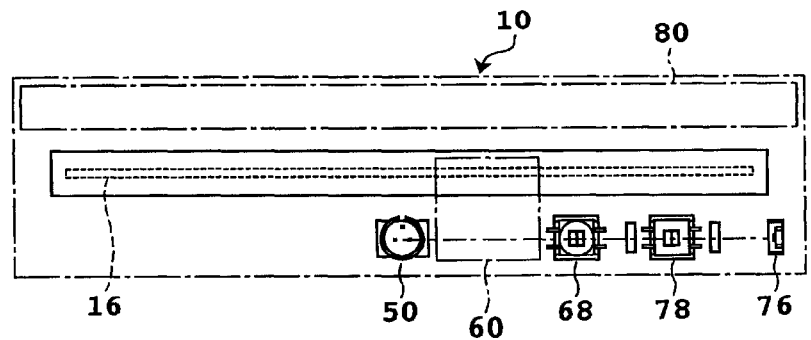
FIG. 10 is a front elevation of FIG. 8.

Referring to FIG. 8, there is shown a plan view of an optical system in the magneto-optical disk drive 10. FIG. 9 is a right side view of FIG. 8, and FIG. 10 is a front elevation of FIG. 8. A laser beam emitted from a semiconductor laser 50 is converted into a parallel light beam by a collimator lens 52, and the parallel light beam enters a polarization beam splitter 54. The polarization beam splitter 54 has a transmitting characteristic and a reflecting characteristic as set in the following manner. For example, letting Tp and Ts denote the transmittances of a P-polarized light component and an S-polarized light component, respectively, and Rp and Rs denote the reflectances to a P-polarized light component and an S-polarized light component, respectively, the transmitting characteristic and the reflecting characteristic are set to satisfy the relations of Tp:Rp=80:20 and Ts:Rs=2:98.

A laser beam transmitted by the polarization beam splitter 54 according to the transmitting characteristic thereof is reflected by a beam raising mirror 56 in the optical head 44, and then focused onto the magneto-optical disk 16 by an objective lens 58 in the optical head 44. In writing information onto the magneto-optical disk 16, a bias magnetic field having a fixed direction is applied to a laser directing position on the magneto-optical disk 16 by the bias magnetic field generating mechanism 48 (see FIG. 7) located opposite to the objective lens 58 with respect to the magneto-optical disk 16. Accordingly, a recording mark is formed on the magneto-optical disk 16 by the laser beam focused thereon.

In reproducing the information recorded on the magneto-optical disk 16, a laser beam having a power lower than that of the laser beam for recording is directed onto the magneto-optical disk 16, and the orientation of a polarization plane of reflected light from the recording mark on the magneto-optical disk 16 is detected. The reflected light from the magneto-optical disk 16 is collimated by the objective lens 58, next reflected by the beam raising mirror 56, and next reflected by the polarization beam splitter 54 according to the reflecting characteristic thereof. The light beam from the polarization beam splitter 54 is passed through a phase compensation unit mounting space 60 for mounting a phase compensation unit (to be hereinafter described) which is characteristic of the present invention. Thereafter, the light beam is divided into two laser beams by a first beam splitter 62.

The laser beam reflected by the first beam splitter 62 is passed through a Wollaston prism 64, and next focused on a two-section photodetector 68 for detecting a magneto-optical signal (MO signal) by a condenser lens 66. On the other hand, the laser beam transmitted by the first beam splitter 62 is passed through a condenser lens 70, and next divided into two laser beams by a second beam splitter 72. One of these two laser beams is introduced into a four-section photodetector 76 for detecting a focusing error, and the other laser beam is introduced into a two-section photodetector 78 for detecting a tracking error. In this preferred embodiment, the focusing error is measured by a knife-edge method, and the tracking error is measured by a push-pull method. Reference numeral 74 denotes a knife edge.

In this preferred embodiment, a phase compensation unit to be hereinafter described is inserted in the phase compensation unit mounting space 60 to perform phase compensation for the laser beam reflected on the magneto-optical disk 16. In the case of a commercially available 3.5-inch magneto-optical disk drive, a cubic space having a side of about 13 mm may be used as the phase compensation unit mounting space 60 in consideration of a circuit space 80 for accommodating a printed circuit board.

Figure 11:
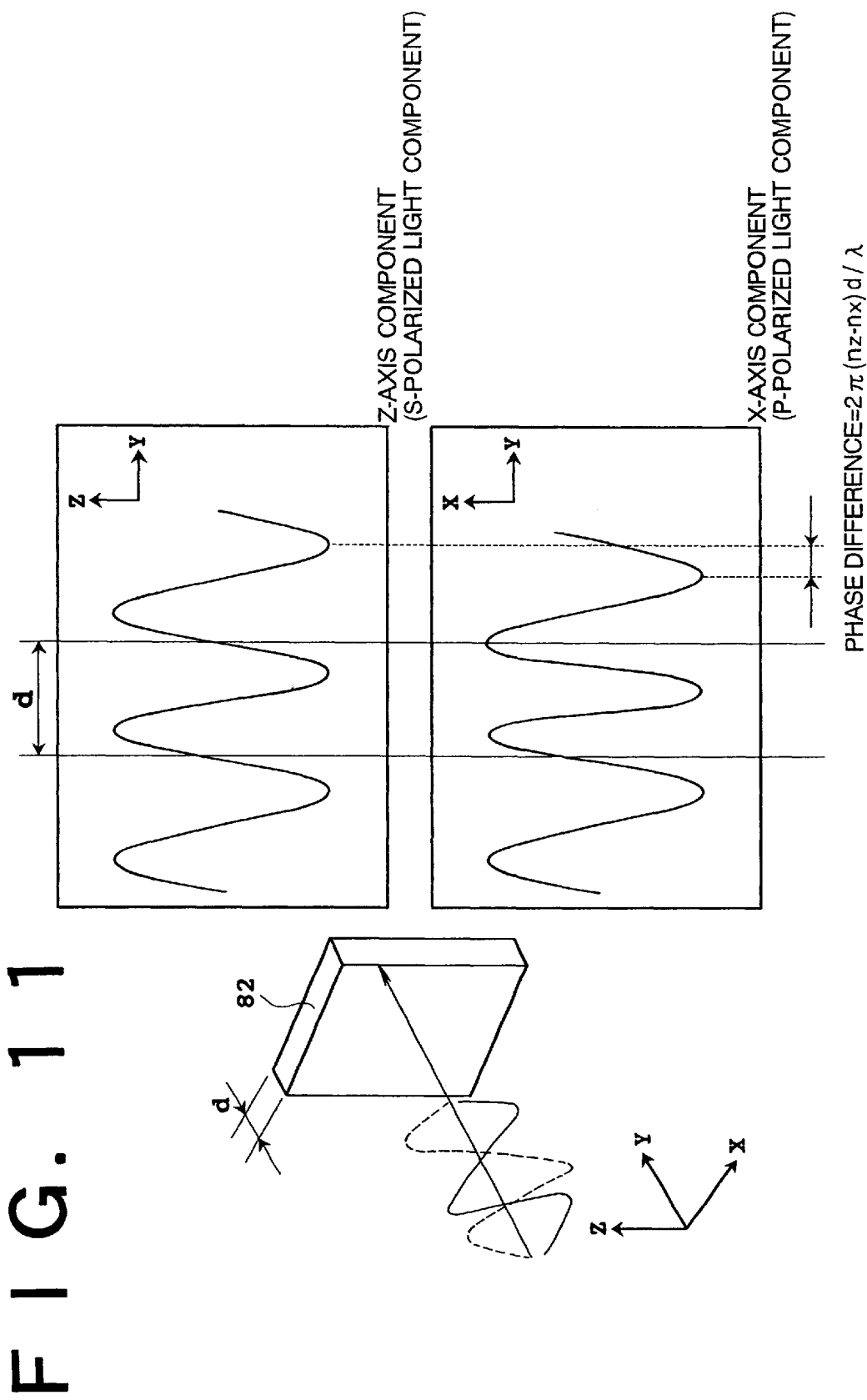
FIG. 11 is an illustration of the principle of phase compensation in the present invention.

FIG. 11 illustrates the principle of phase compensation in the present invention. When a laser beam is directed to a phase plate 82 such as a half-wave plate, a phase difference $\Delta$ is generated between a Z-axis component (S-polarized light component) of the laser beam and an X-axis component (P-polarized light component) of the laser beam. The phase difference $\Delta$ is a function of the thickness d of the phase plate 82 and the refractive indices $n_z$ and $n_x$ of the phase plate 82 in the Z-axis and X-axis directions, and it is expressed as follows:

$$\Delta = 2\pi(n_z - n_x)d/\lambda$$

By tilting the phase plate 82, the thickness d along the optical path of the laser beam in the phase plate 82 is changed, resulting in a change in the phase difference $\Delta$. This principle is applied to all the preferred embodiments to be hereinafter described.

Figure 12:
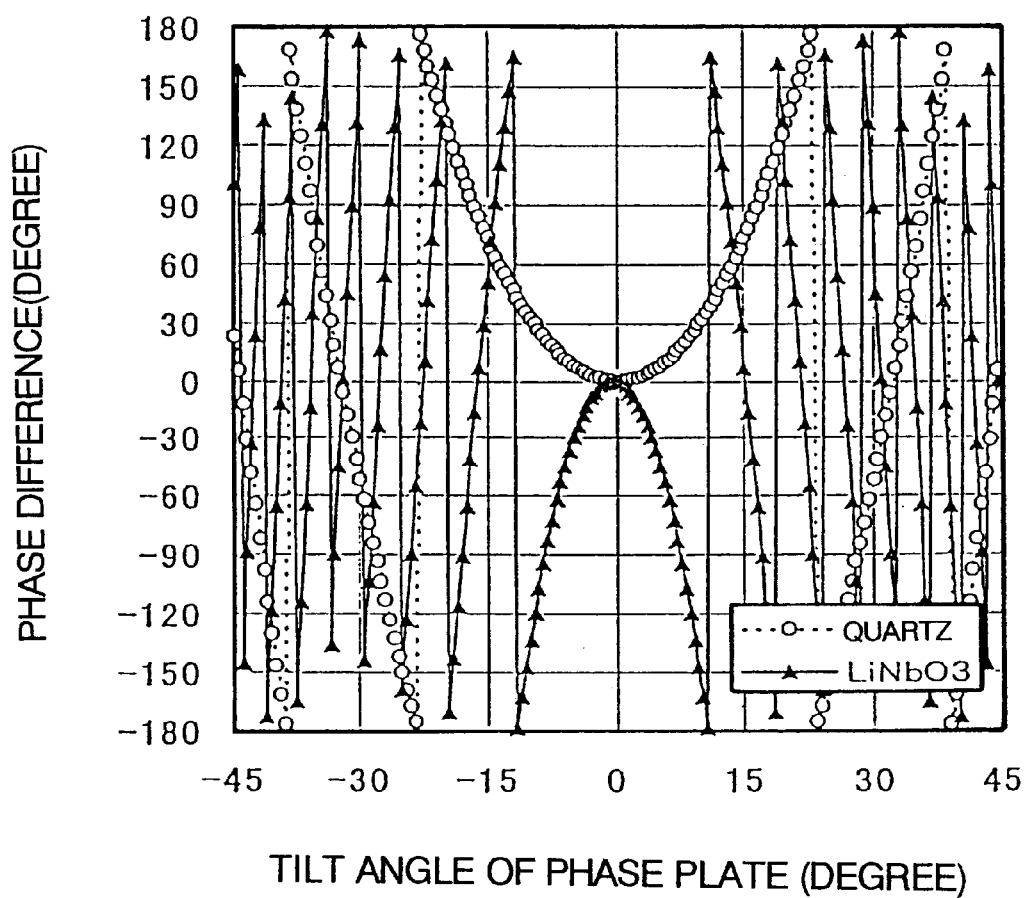
FIG. 12 is a graph showing an example of the relation between phase plate tilt angle and phase difference.
Figure 13:
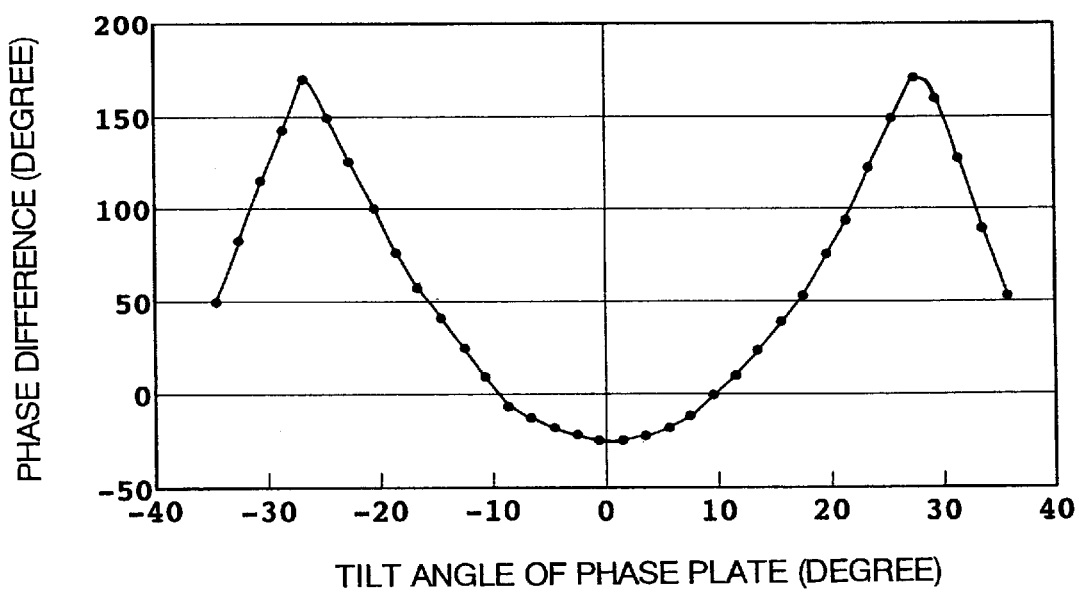
FIG. 13 is a graph showing another example of the relation between phase plate tilt angle and phase difference.

FIG. 12 is a graph showing an example of the relation between the tilt angle $\theta$ of a phase plate and the phase difference $\Delta$ as obtained by calculation. In the case that quartz is adopted as the phase plate, a phase difference ranging from 0° to +180° can be obtained by changing the tilt angle of the phase plate from 0° to +25°. In each preferred embodiment to be hereinafter described, the tilt angle of the phase plate is assumed to be changed between 0° and +32°. In the case that lithium niobate (LiNbO$_3$) is adopted as the phase plate, a phase difference ranging from 0° to –180° can be obtained by changing the tilt angle of the phase plate from 0° to +10°. FIG. 13 is a graph showing another example of the relation between the tilt angle of a phase plate and the phase difference. In this example, the phase plate is formed of quartz. By using this phase plate, a phase difference ranging from –20° to +180° can be obtained by changing the tilt angle of the phase plate from 0° to +30°.

Figure 14:
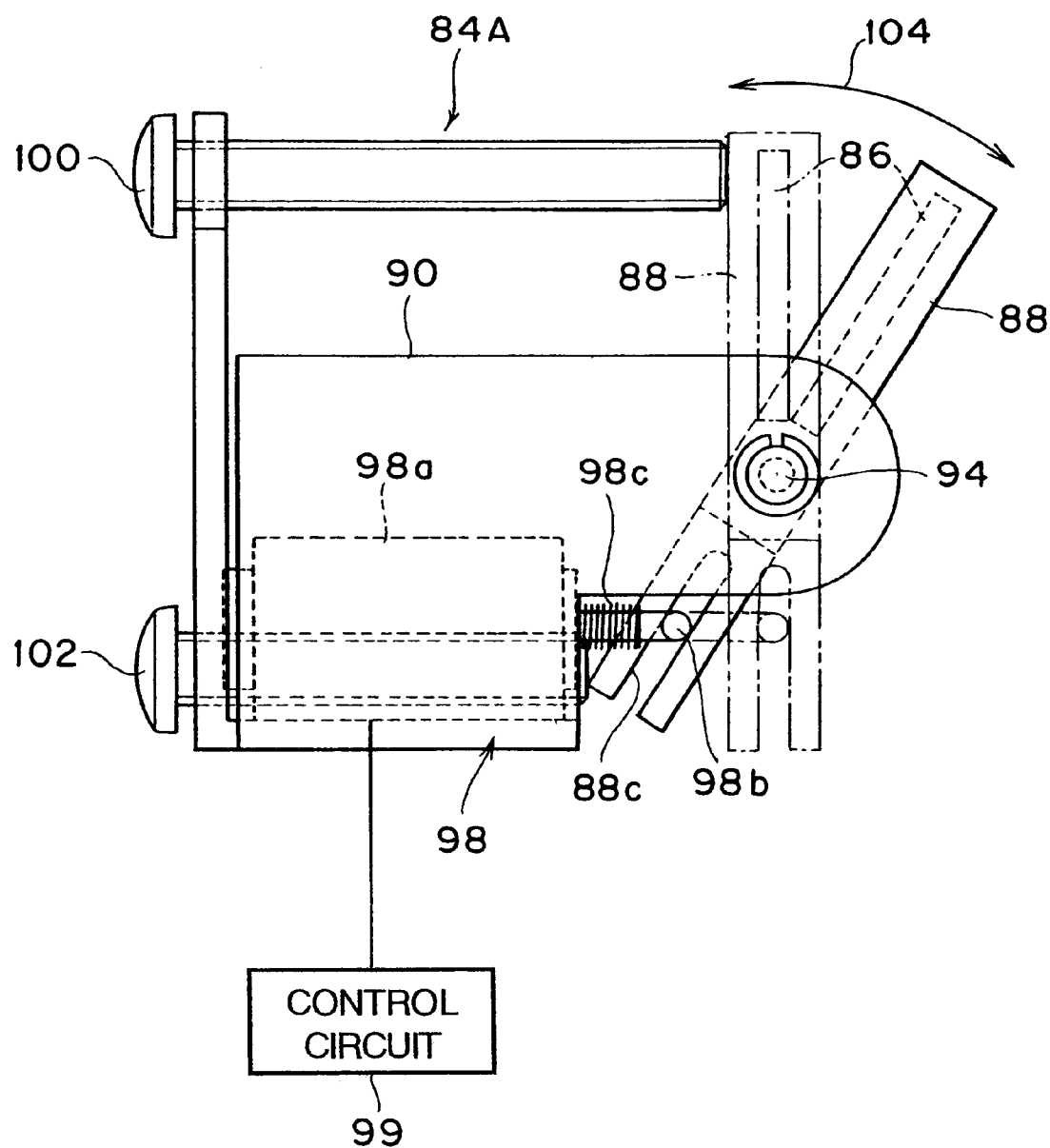
FIG. 14 is an elevational view of a phase compensation unit according to a first preferred embodiment of the present invention.
Figure 15:
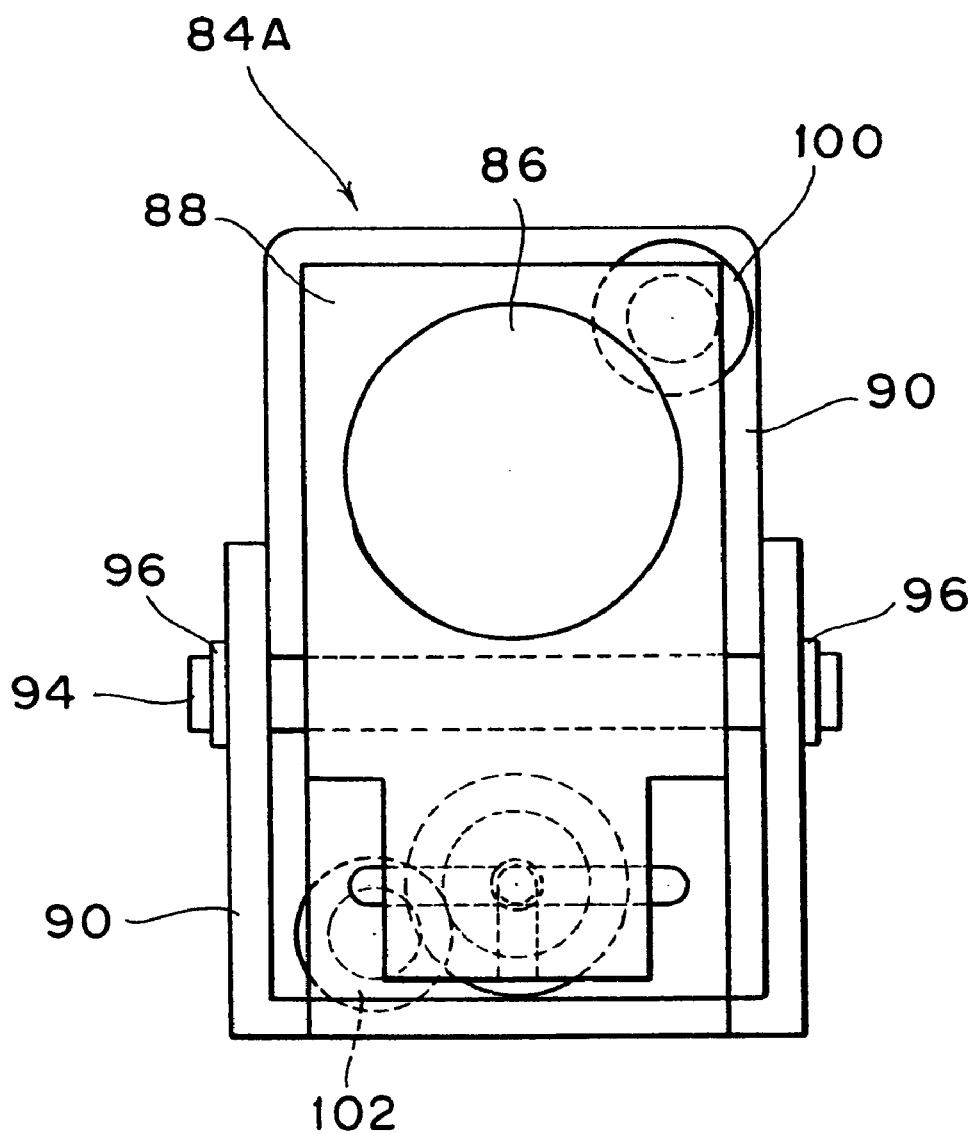
FIG. 15 is a right side view of the phase compensation unit shown in FIG. 14.
Figure 16:
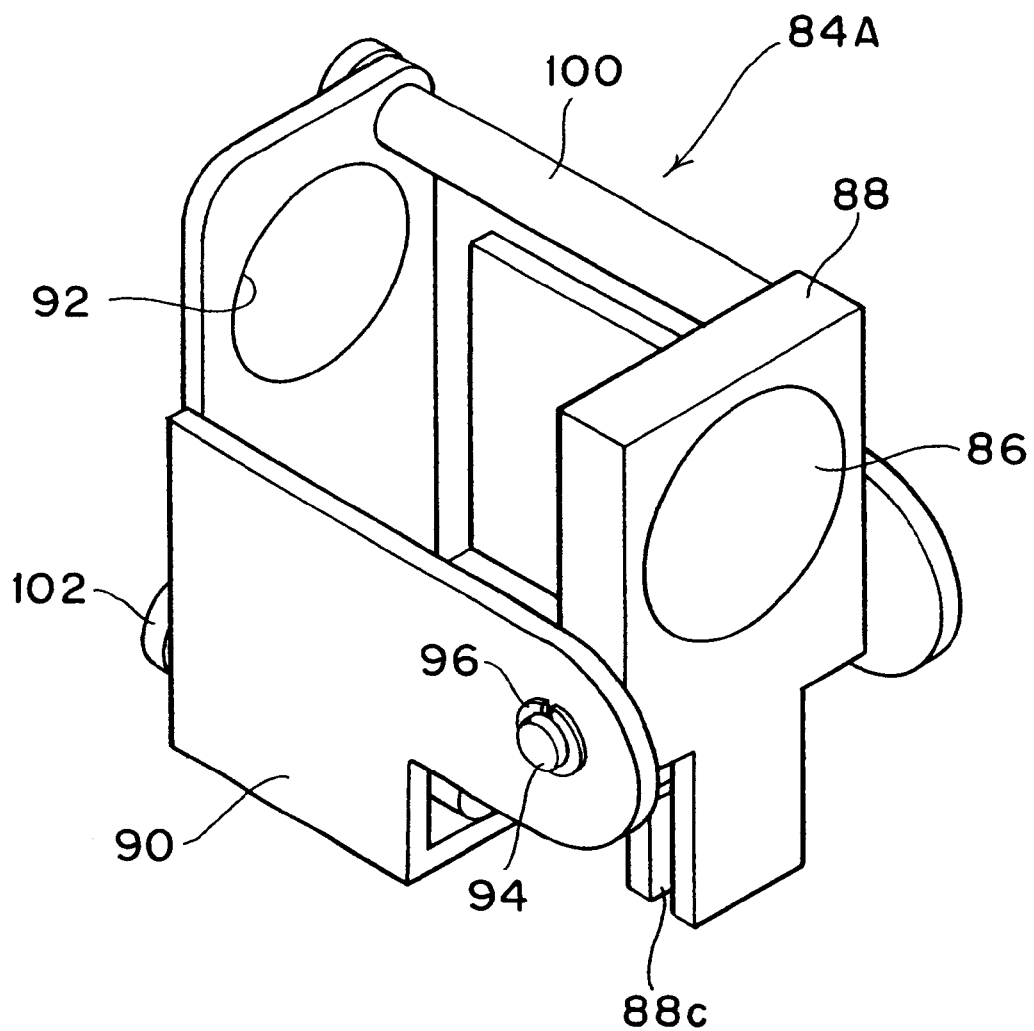
FIG. 16 is a perspective view of the phase compensation unit shown in FIG. 14.
Figure 17:
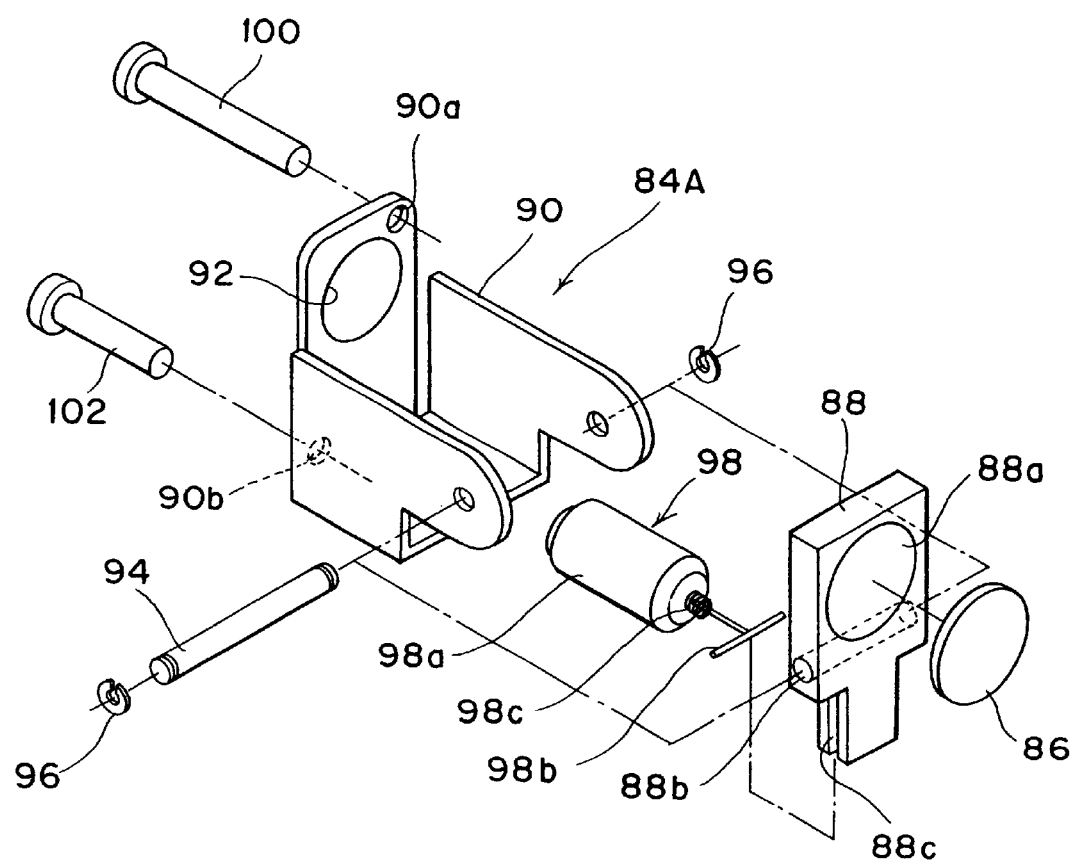
FIG. 17 is an exploded perspective view of the phase compensation unit shown in FIG. 14.

Referring to FIG. 14, there is shown an elevational view of a phase compensation unit 84A according to a first preferred embodiment of the present invention. FIG. 15 is a right side view of the phase compensation unit 84A; FIG. 16 is a perspective view of the phase compensation unit 84A; and FIG. 17 is an exploded perspective view of the phase compensation unit 84A. The phase compensation unit 84A is mounted in the phase compensation unit mounting space 60 shown in FIG. 8. Referring mainly to FIG. 17, a phase plate 86 formed of a uniaxial crystal of quartz is fitted with a hole 88a of a housing 88 formed of resin, and is fixed to the housing 88 by an adhesive. A shaft 94 is press-fitted with a through hole 88b of the housing 88, and the housing 88 is pivotably mounted through the shaft 94 to a frame 90 formed of iron. Two C-rings 96 are engaged with the shaft 94 at its opposite ends to prevent axial movement of the shaft 94 relative to the frame 90.

Reference numeral 98 generally denotes an actuator for tilting the phase plate 86. The actuator 98 is composed of a solenoid 98a including a magnetic circuit, a T-shaped plunger 98b operatively connected to the solenoid 98a, and a coil spring 98c mounted on the T-shaped plunger 98b for normally biasing the plunger 98b in its projecting direction. The plunger 98b is slidably engaged at its front end with a U-shaped recess 88c cut in the housing 88. The frame 90 has a hole 92 for allowing pass of the laser beam reflected on the disk 16, and a pair of tapped holes 90a and 90b. A pair of adjustable screws 100 and 102 are threadedly engaged with the tapped holes 90a and 90b of the frame 90, respectively. The screws 100 and 102 function as stoppers for the housing 88 in the inoperative and operative conditions of the solenoid 98a, respectively.

In the inoperative condition of the solenoid 98a, the plunger 98b is expanded (projected from the solenoid 98a) by the biasing force of the coil spring 98c, and an upper end portion of the housing 88 is in abutment against the screw 100. In this condition, the phase plate 86 is substantially perpendicular to an optical path of the reflected light beam. When a DC voltage (+5V) is applied to the solenoid 98a, the plunger 98b is contracted (pulled into the solenoid 98a) against the biasing force of the coil spring 98c, so that the housing 88 is rotated clockwise as viewed in FIG. 14 about the axis of the shaft 94 until a lower end portion of the housing 88 abuts against the screw 102.

That is, since the plunger 98b is slidably engaged with the recess 88c of the housing 88, the phase plate 86 fixed to the housing 88 is tilted in the opposite directions shown by a double-headed arrow 104 in FIG. 14 by switching on and off the applied voltage to the solenoid 98a, thereby obtaining a phase difference between a P-polarized light component and an S-polarized light component of the reflected light beam according to the tilt angle of the phase plate 86. As mentioned above, the screws 100 and 102 are adjustably mounted on the frame 90, and function as stoppers for the housing 88 in the inoperative and operative conditions of the solenoid 98a, respectively. By adjusting the feeds of the screws 100 and 102, the tilt angle of the phase plate 86 can be arbitrarily changed within the stroke of the plunger 98b.

By adjusting the tilt angle of the phase plate 86 with the screws 100 and 102 so as to provide optimum phase differences in reproducing information recorded on a land track and a groove track, it is possible to give optimum phase compensation amounts for land track reading and groove track reading to the reflected light beam by energizing and de-energizing the solenoid 98a. For example, the position where the housing 88 abuts against the screw 100 is used for land track reading, and the position where the housing 88 abuts against the screw 102 is used for groove track reading.

A control circuit 99 such as an MPU is connected to the solenoid 98a as shown in FIG. 14. The control circuit 99 determines whether the track undergoing reproduction is a land or a groove according to the address on the magneto-optical disk 16 or the polarity of a tracking error signal, for example, and supplies to the solenoid 98a a control signal indicative of a land or a groove. Accordingly, the phase plate 86 can be tilted according to whether the track undergoing reproduction is a land or a groove, and an optimum phase compensation amount for each track reproduction can be given to the reflected light beam.

The screws 100 and 102 as stoppers may also be used for fine adjustment in assembling each of individual magneto-optical disk drives so as to provide optimum phase compensation amounts for land track reproduction and groove track reproduction in each magneto-optical disk drive. Further, in the case that the optimum phase compensation amounts for land track reproduction and groove track reproduction are equal to each other, the operative condition of the solenoid 98a where the phase plate 86 is tilted may be used as phase points for land track reading and groove track reading, and the inoperative condition of the solenoid 98a where the phase plate 86 is not tilted may be used as a point of zero phase difference. In this case, the present invention can be applied also to a conventional recording disk not requiring phase compensation, thus realizing higher downward compatibility.

Figure 18:
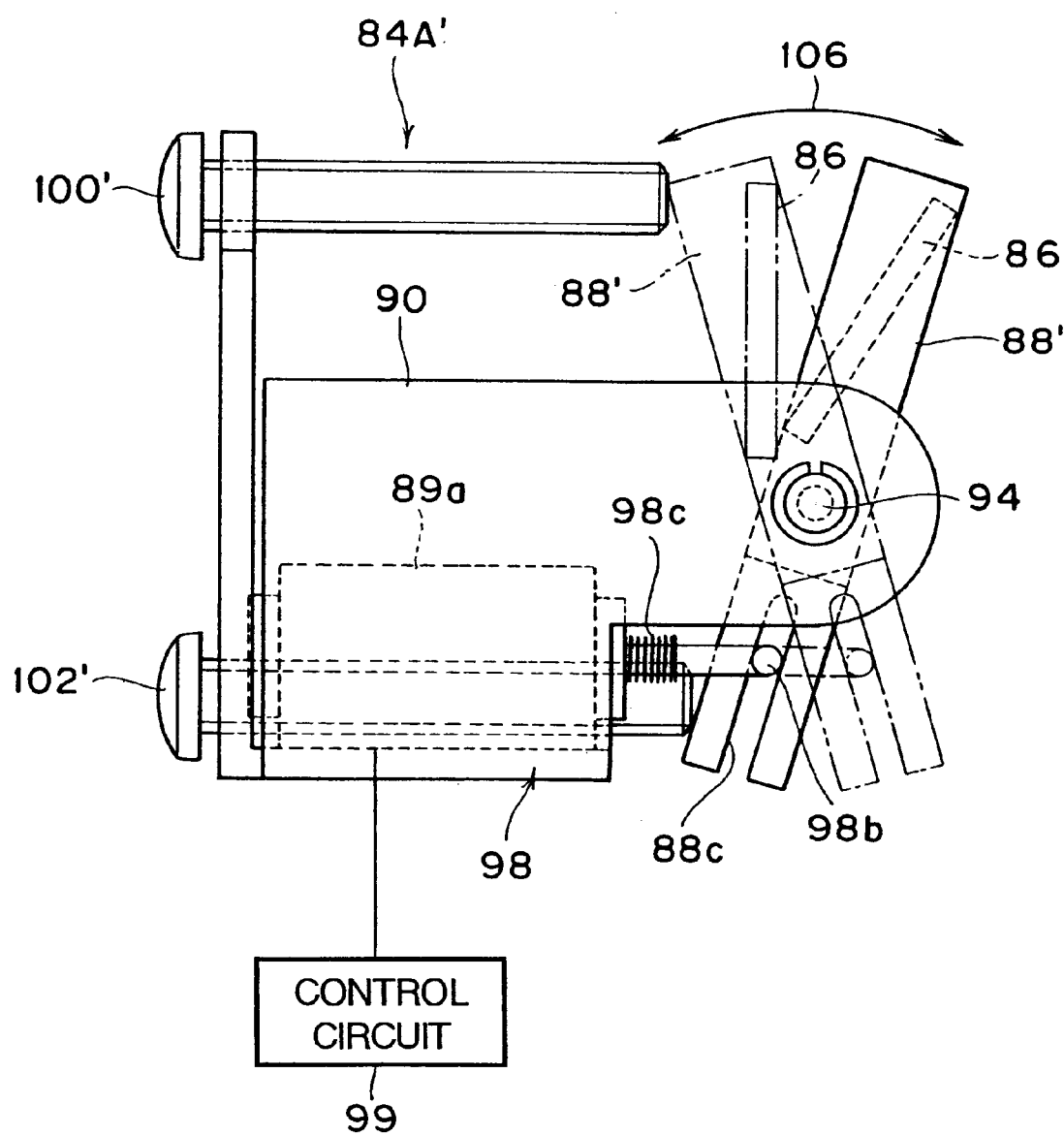
FIG. 18 is a view similar to FIG. 14, showing a modification of the first preferred embodiment.

Referring to FIG. 18, there is shown a modification 84A' of the phase compensation unit according to the first preferred embodiment of the present invention. In this modification, the phase plate 86 is mounted in a housing 88' so as to be preliminarily tilted with respect to the housing 88'. In the inoperative condition of the solenoid 98a, the housing 88' is tilted from its vertical position counterclockwise as viewed in FIG. 18 by the biasing force of the coil spring 98c, and an upper end portion of the housing 88' abuts against a screw 100' as a stopper. In this condition, the phase plate 86 is substantially perpendicular to the optical path of the reflected light beam.

When the solenoid 98a is excited, the housing 88' is rotated clockwise as viewed in FIG. 18, and a lower end portion of the housing 88' abuts against a screw 102' as another stopper. By switching on and off the applied voltage to the solenoid 98a, the phase plate 86 is tilted in the opposite directions shown by a double-headed arrow 106, thereby obtaining a phase difference corresponding to the tilt angle of the phase plate 86. According to this modification, the phase plate 86 is preliminarily tilted with respect to the housing 88', so that the clockwise and counterclockwise rotating angles of the housing 88' from its vertical position can be made equal to each other.

Figure 19:
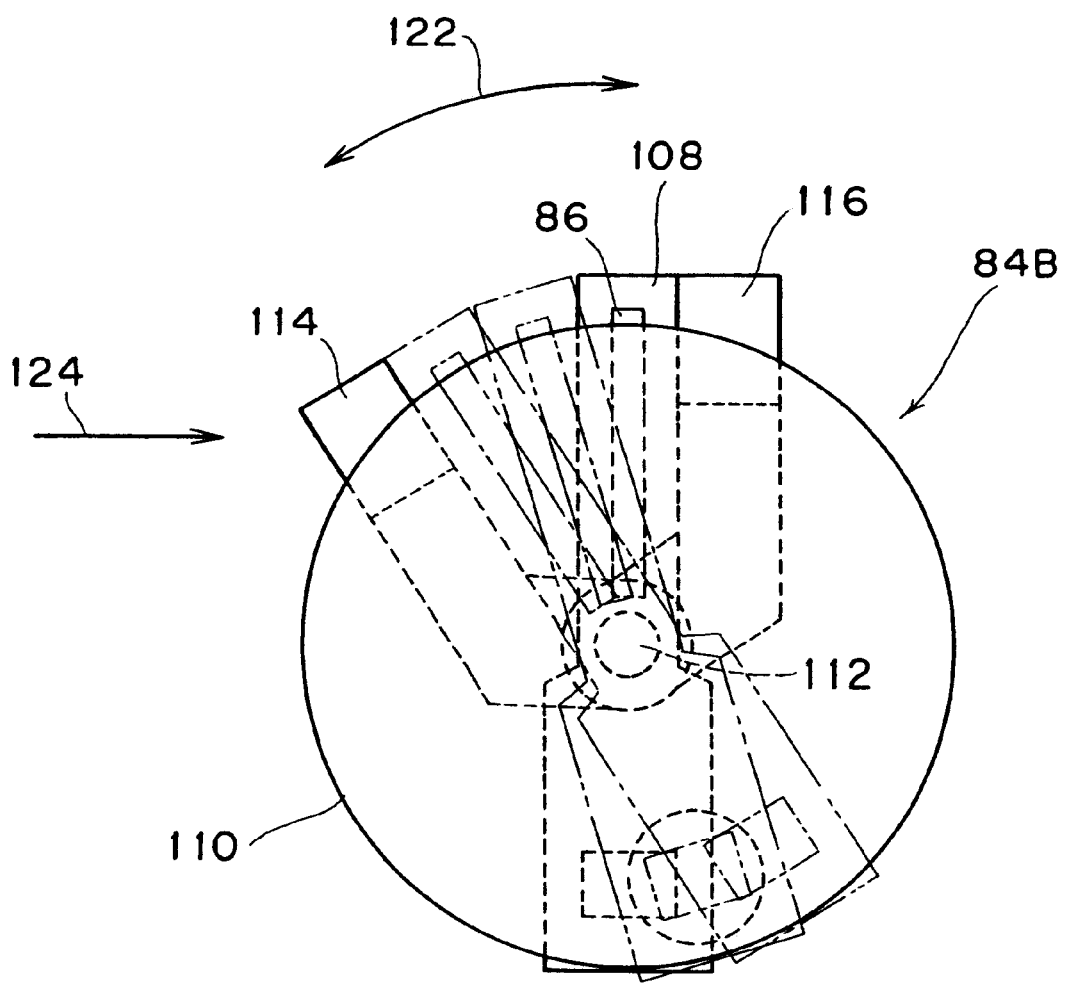
FIG. 19 is an elevational view of a phase compensation unit according to a second preferred embodiment of the present invention.
Figure 20:
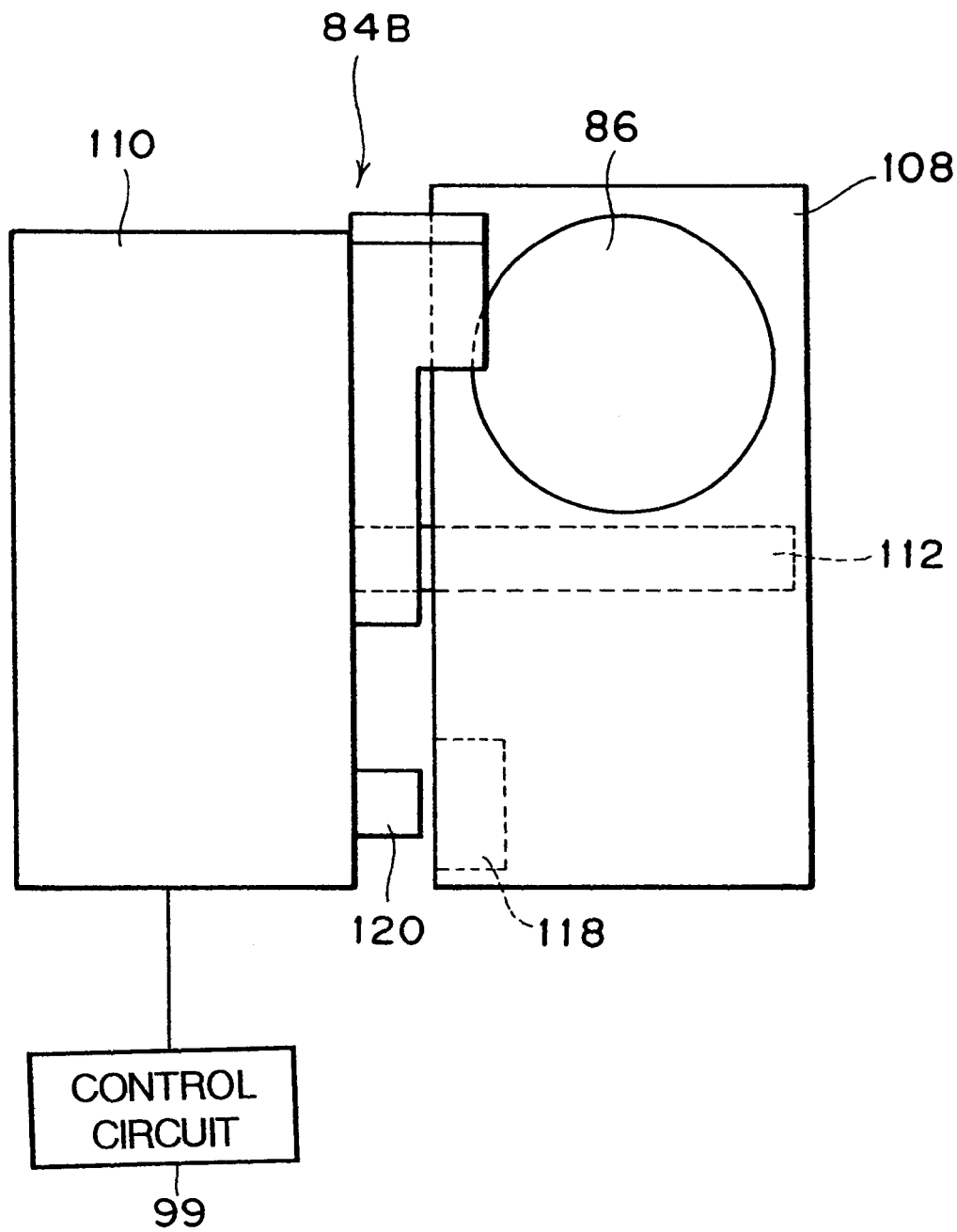
FIG. 20 is a right side view of the phase compensation unit shown in FIG. 19.
Figure 21:
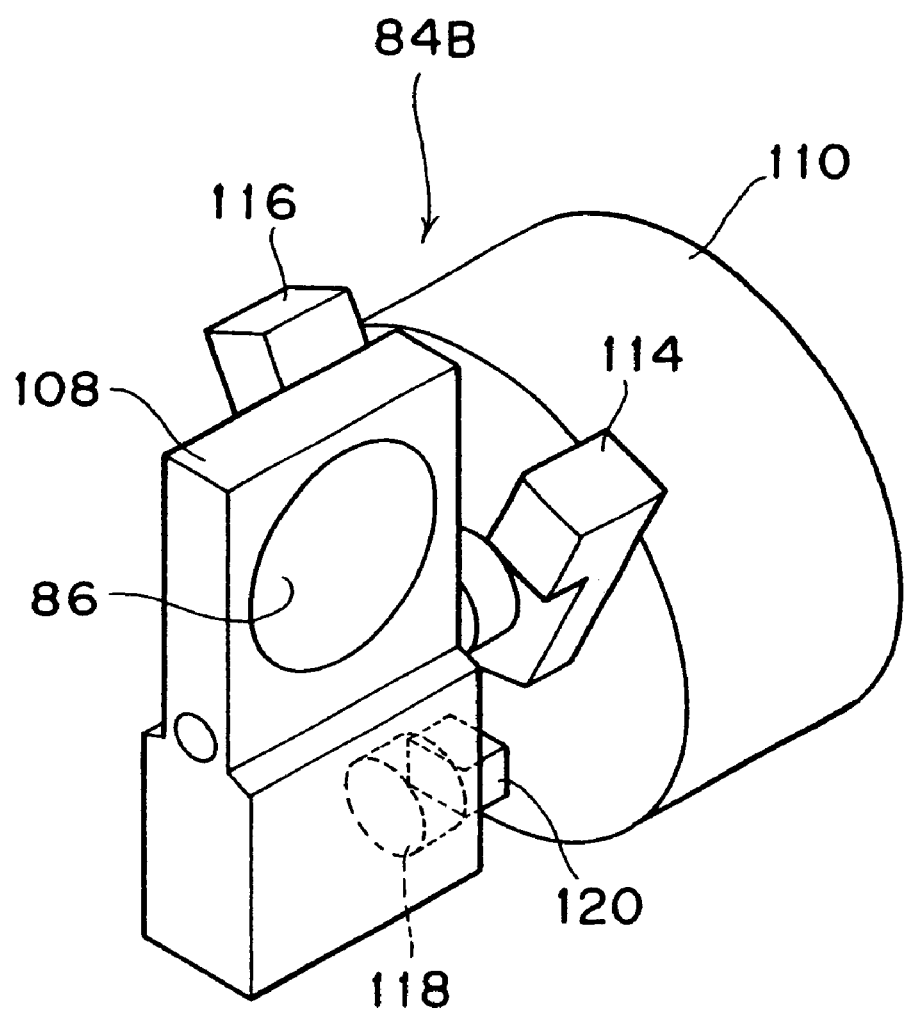
FIG. 21 is a perspective view of the phase compensation unit shown in FIG. 19.
Figure 22:
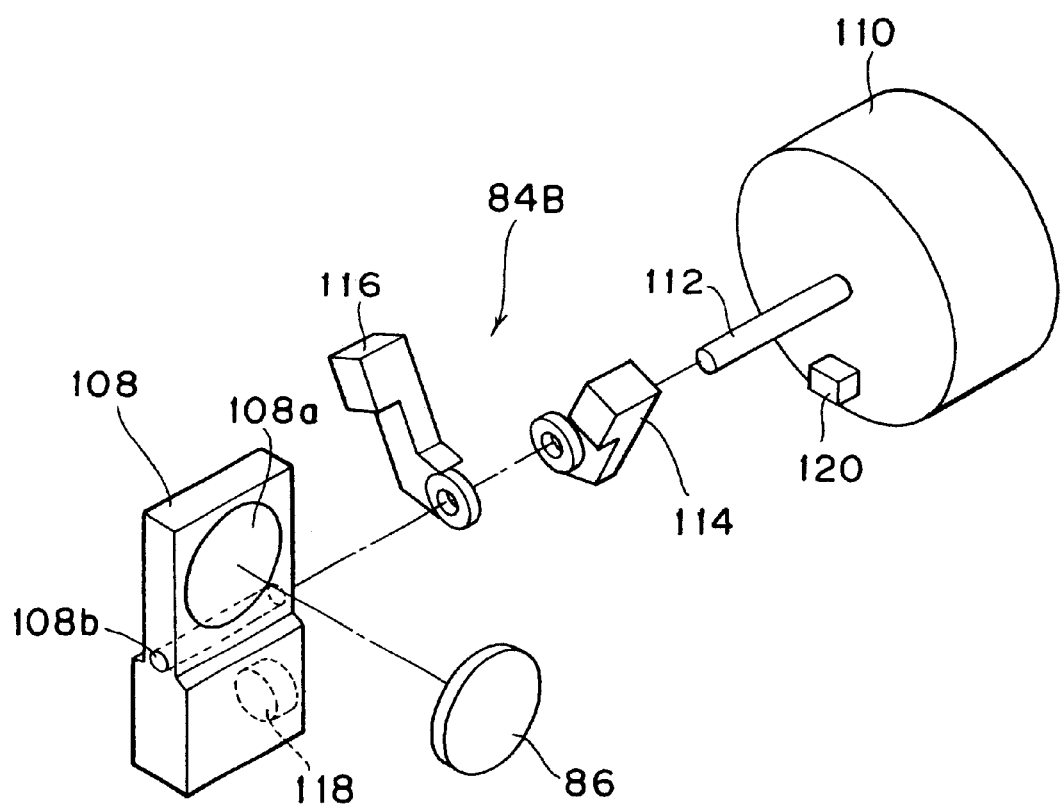
FIG. 22 is an exploded perspective view of the phase compensation unit shown in FIG. 19.

Referring to FIG. 19, there is shown an elevational view of a phase compensation unit 84B according to a second preferred embodiment of the present invention. FIG. 20 is a right side view of the phase compensation unit 84B; FIG. 21 is a perspective view of the phase compensation unit 84B; and FIG. 22 is an exploded perspective view of the phase compensation unit 84B. The phase compensation unit 84B may be mounted in the phase compensation unit mounting space 60 shown in FIG. 8. Referring mainly to FIG. 22, the phase plate 86 is fitted with a hole 108a of a housing 108 formed of resin, and is fixed to the housing 108 by an adhesive. The housing 108 has a through hole 108b. A shaft 112 of a reversible DC motor 110 is press-fitted with the through hole 108b of the housing 108, thereby fixedly mounting the housing 108 on the shaft 112 of the motor 110. By applying voltages of different polarities to the DC motor 110, the housing 108 can be rotated about the axis of the shaft 112 in the opposite directions shown by a double-headed arrow 122 in FIG. 19, thereby obtaining a phase difference corresponding to the tilt angle of the phase plate 86.

A pair of stoppers 114 and 116 are fitted with the shaft 112, and are fixed to an end surface of the DC motor 110 by an adhesive or the like in such a manner that a given angle is defined between the stoppers 114 and 116. By changing the polarity of the voltage applied to the DC motor 110, the housing 108 can be made to abut against the stoppers 114 and 116, thereby giving to the reflected light beam optimum phase compensation amounts for land track reproduction and groove track reproduction. Like the first preferred embodiment, the stoppers 114 and 116 may be adjusted in position to be fixed to the DC motor 110, thereby realizing optimum phase compensation amounts desired by individual magneto-optical disk drives.

In FIG. 19, the reflected light beam propagates in the direction shown by an arrow 124, and the phase compensation unit 84B may be mounted in the phase compensation unit mounting space 60 shown in FIG. 8 so that the phase plate 86 is substantially perpendicular to the optical path along the direction 124 in the condition where the housing 108 abuts against the stopper 116. Like the first preferred embodiment, a control circuit 99 such as an MPU is connected to the DC motor 110 as shown in FIG. 20. The control circuit 99 determines whether the track undergoing reproduction is a land or a groove according to the address on the magneto-optical disk 16 or the polarity of a tracking error signal, for example, and supplies to the DC motor 110 a control signal indicative of a land or a groove. Accordingly, the phase plate 86 can be tilted according to whether the track undergoing reproduction is a land or a groove, and an optimum phase compensation amount for each track reproduction can be given to the reflected light beam.

Furthermore, a magnet 118 is mounted in the housing 108, and a Hall element 120 is mounted on the DC motor 110 so as to face the magnet 118. By detecting the rotative position of the magnet 118 with the Hall element 120 during rotation of the housing 108, another phase point in addition to the two phase points for land track reading and groove track reading can be selected. By using one of these three phase points corresponding to the magnet 118, the stopper 114, and the stopper 116 as a point of zero phase difference, higher downward compatibility can be realized like the first preferred embodiment.

Figure 23:
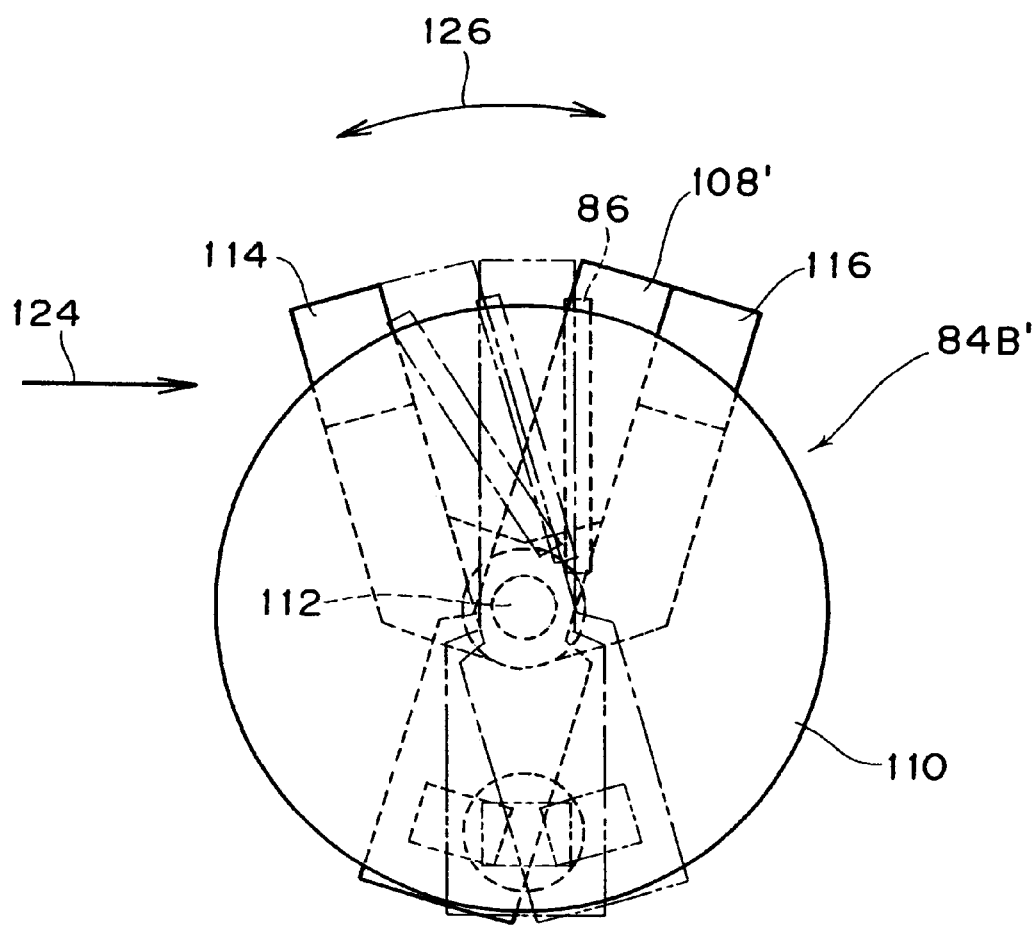
FIG. 23 is a view similar to FIG. 19, showing a modification of the second preferred embodiment.

Referring to FIG. 23, there is shown a modification 84B' of the phase compensation unit according to the second preferred embodiment. In this modification, the phase plate 86 is mounted in a housing 108' so as to be preliminarily tilted with respect to the housing 108', and the clockwise and counterclockwise rotating angles of the housing 108' from its vertical position are made equal to each other. When the housing 108' abuts against the stopper 116, the phase plate 86 is substantially perpendicular to the optical path of the reflected light beam as shown by an arrow 124 in FIG. 23. By driving the DC motor 110 in the normal and reverse directions, the phase plate 86 can be rotated in the opposite directions shown by a double-headed arrow 126 in FIG. 23, thereby changing the tilt angle of the phase plate 86.

Figure 24:
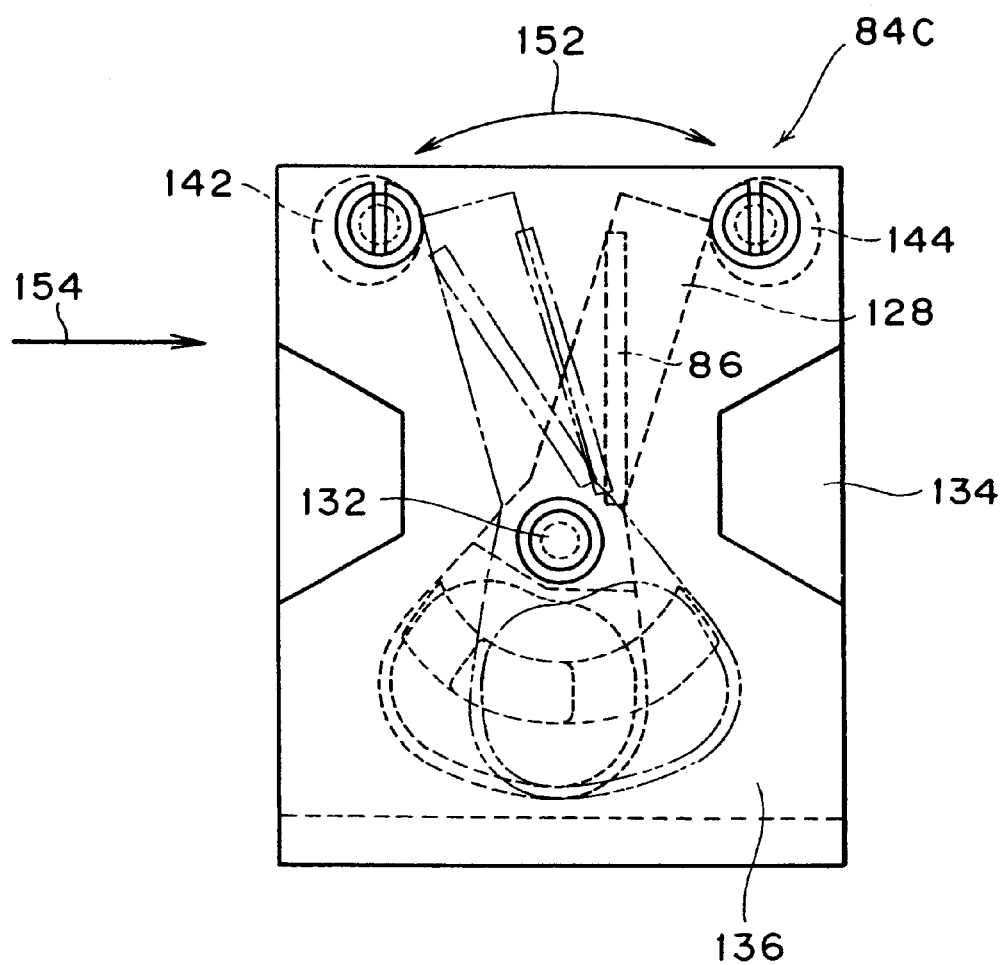
FIG. 24 is an elevational view of a phase compensation unit according to a third preferred embodiment of the present invention.
Figure 25:
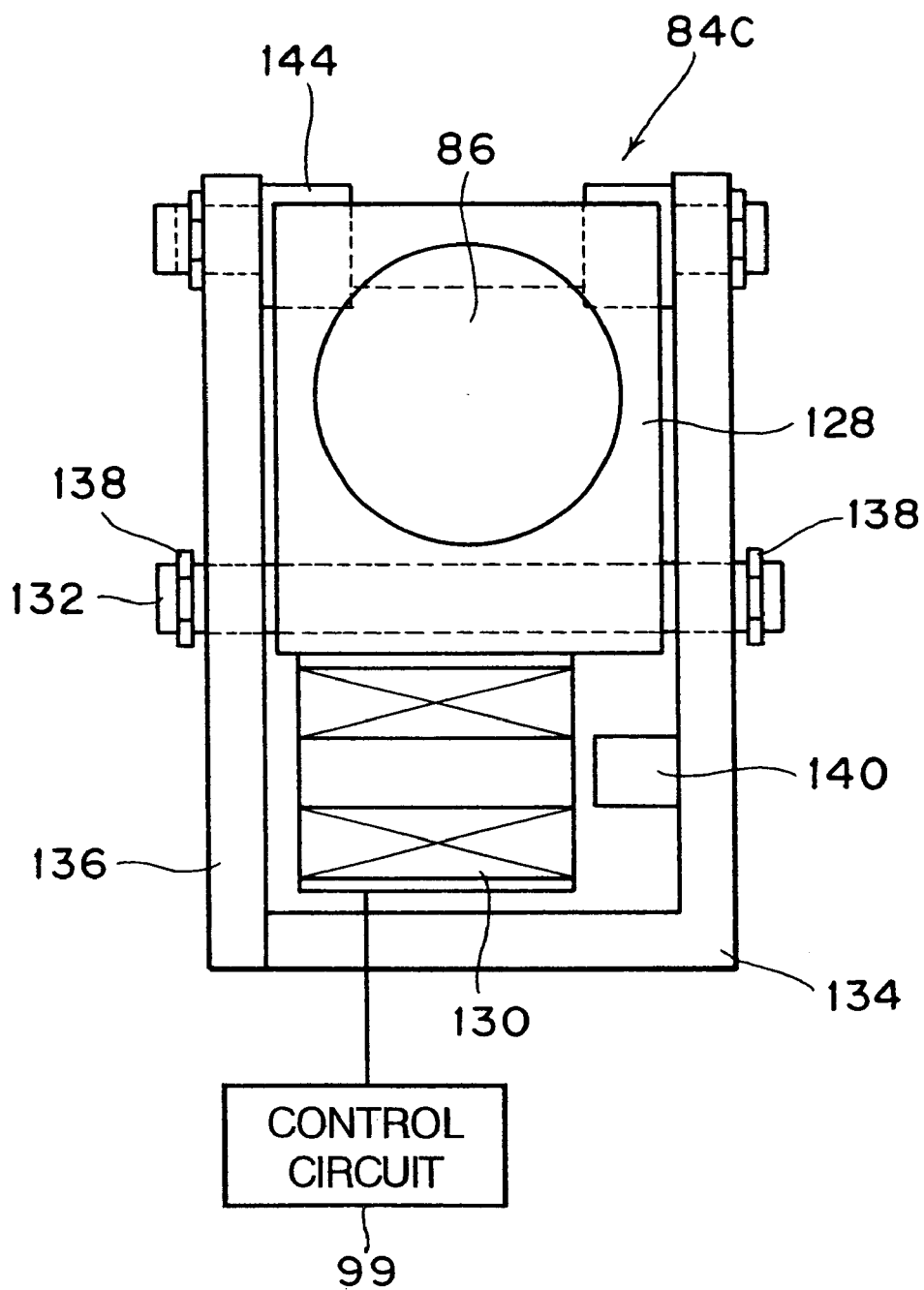
FIG. 25 is a right side view of the phase compensation unit shown in FIG. 24.
Figure 26:
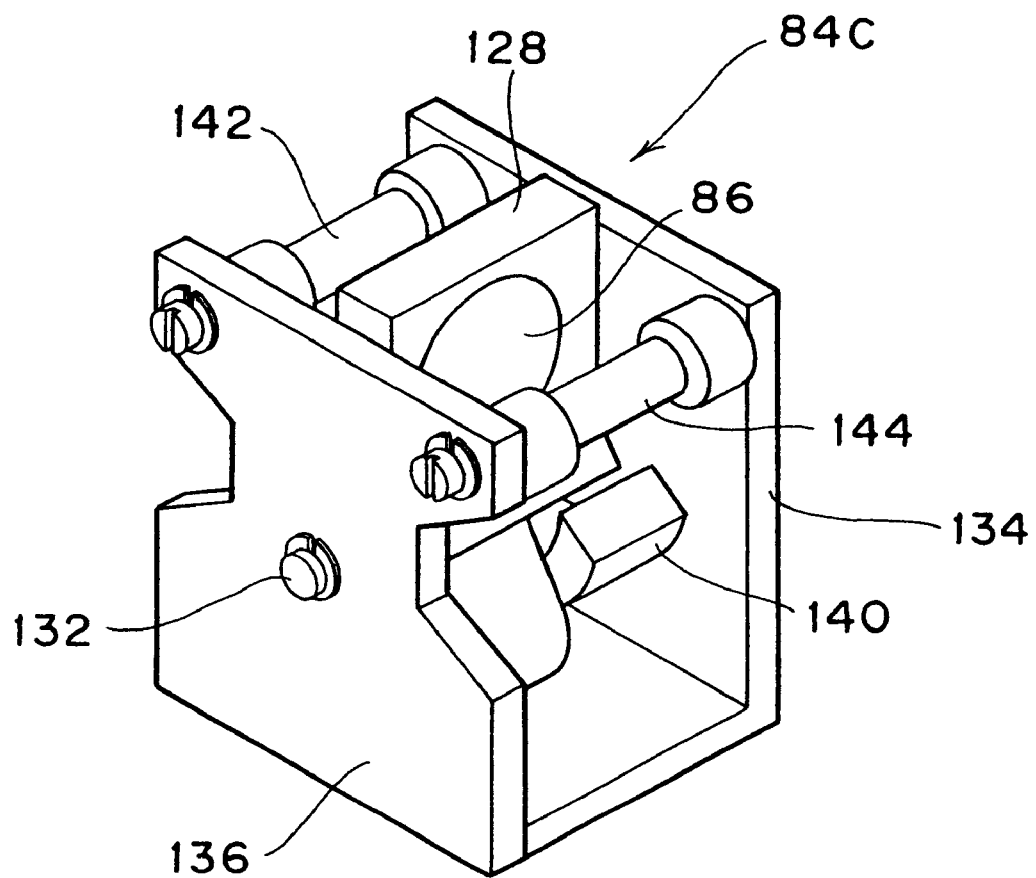
FIG. 26 is a perspective view of the phase compensation unit shown in FIG. 24.
Figure 27:
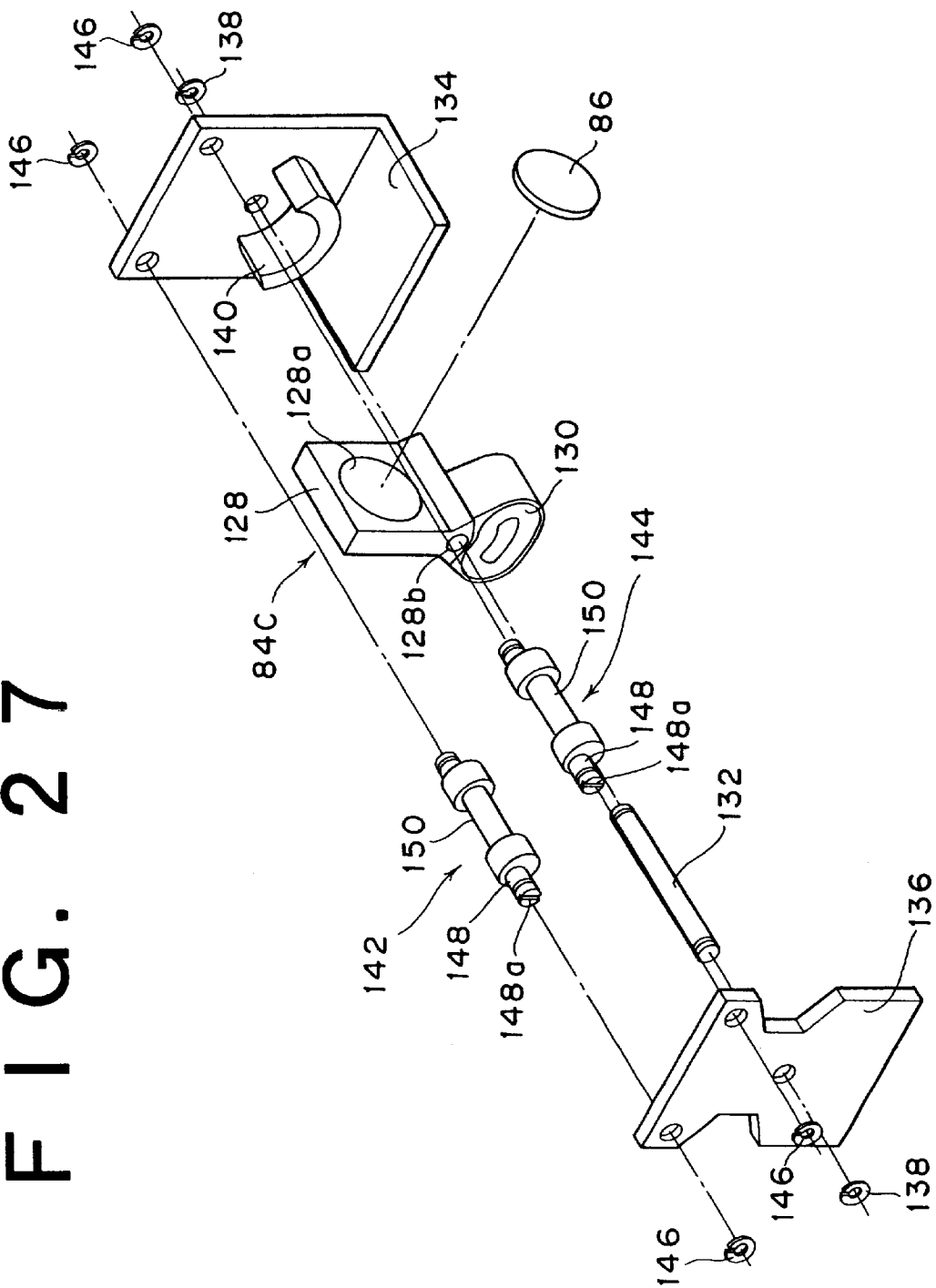
FIG. 27 is an exploded perspective view of the phase compensation unit shown in FIG. 24.

Referring to FIG. 24, there is shown an elevational view of a phase compensation unit 84C according to a third preferred embodiment of the present invention. FIG. 25 is a right side view of the phase compensation unit 84C; FIG. 26 is a perspective view of the phase compensation unit 84C; and FIG. 27 is an exploded perspective view of the phase compensation unit 84C. The phase compensation unit 84C may be mounted in the phase compensation unit mounting space 60 shown in FIG. 8. Referring mainly to FIG. 27, the phase plate 86 is fitted with a hole 128a of a housing 128 formed of resin, and is fixed to the housing 128 by an adhesive. As shown in FIG. 24, the phase plate 86 is preliminarily tilted with respect to the housing 128.

The housing 128 has a through hole 128b, and a coil 130 is embedded in a lower portion of the housing 128 below the through hole 128b. A shaft 132 is press-fitted with the through hole 128b of the housing 128, and the housing 128 is pivotably mounted through the shaft 132 to a pair of magnetic frames 134 and 136 each formed of iron or the like. Two C-rings 138 are engaged with the shaft 132 at its opposite ends to prevent axial movement of the shaft 132 relative to the magnetic frames 134 and 136. A permanent magnet 140 is bonded to the frame 134 so as to face the coil 130. The frames 134 and 136 functioning as a yoke and the permanent magnet 140 form a magnetic circuit. This magnetic circuit and the coil 130 constitute a voice coil motor (VCM). By passing a current through the coil 130, the housing 128 can be rotated about the axis of the shaft 132 in the opposite directions shown by a double-headed arrow 152 in FIG. 24 to thereby tilt the phase plate 86.

A pair of stoppers 142 and 144 for making abutment against the housing 128 are rotatably supported to the frames 134 and 136 at their upper portions so as to extend therebetween. Two C-rings 146 are engaged with each of the stoppers 142 and 144 at its opposite ends to prevent axial movement of the stoppers 142 and 144 relative to the frames 134 and 136. The stoppers 142 and 144 have the same structure such that each of the stoppers 142 and 144 is composed of a resin pole 150 and a shaft 148 press-fitted in the resin pole 150 in eccentric relationship with each other. A slot 148a is formed at one end of the shaft 148. By fitting a flat-blade screwdriver into the slot 148a of the shaft 148 and rotating the stoppers 142 and 144, the tilt angle of the phase plate 86 can be suitably adjusted to thereby obtain optimum phase compensation amounts for land track reading and groove track reading like the first preferred embodiment. When the housing 128 abuts against the stopper 144, the phase plate 86 is substantially perpendicular to the optical path of the reflected light beam shown by an arrow 154 in FIG. 24.

As shown in FIG. 25, a control circuit 99 such as an MPU is connected to the coil 130. The control circuit 99 determines whether the track undergoing reproduction is a land or a groove according to the address on the magneto-optical disk 16 or the polarity of a tracking error signal, for example, and supplies to the coil 130 a control signal indicative of a land or a groove. Accordingly, the phase plate 86 can be tilted according to whether the track undergoing reproduction is a land or a groove, and an optimum phase compensation amount for each track reproduction can be given to the reflected light beam.

Like the first preferred embodiment, two phase points for land track reproduction and groove track reproduction can be set by the abutment of the housing 128 against the stoppers 142 and 144. In addition, the phase plate 86 can be stopped at a desired tilt angle by controlling the current passed through the coil 130, thus realizing a desired phase difference. Accordingly, an arbitrary phase difference can be realized after installing the phase compensation unit 84C into the magneto-optical disk drive without the need for adjustment at the time of assembling the phase compensation unit 84C.

Figure 28:
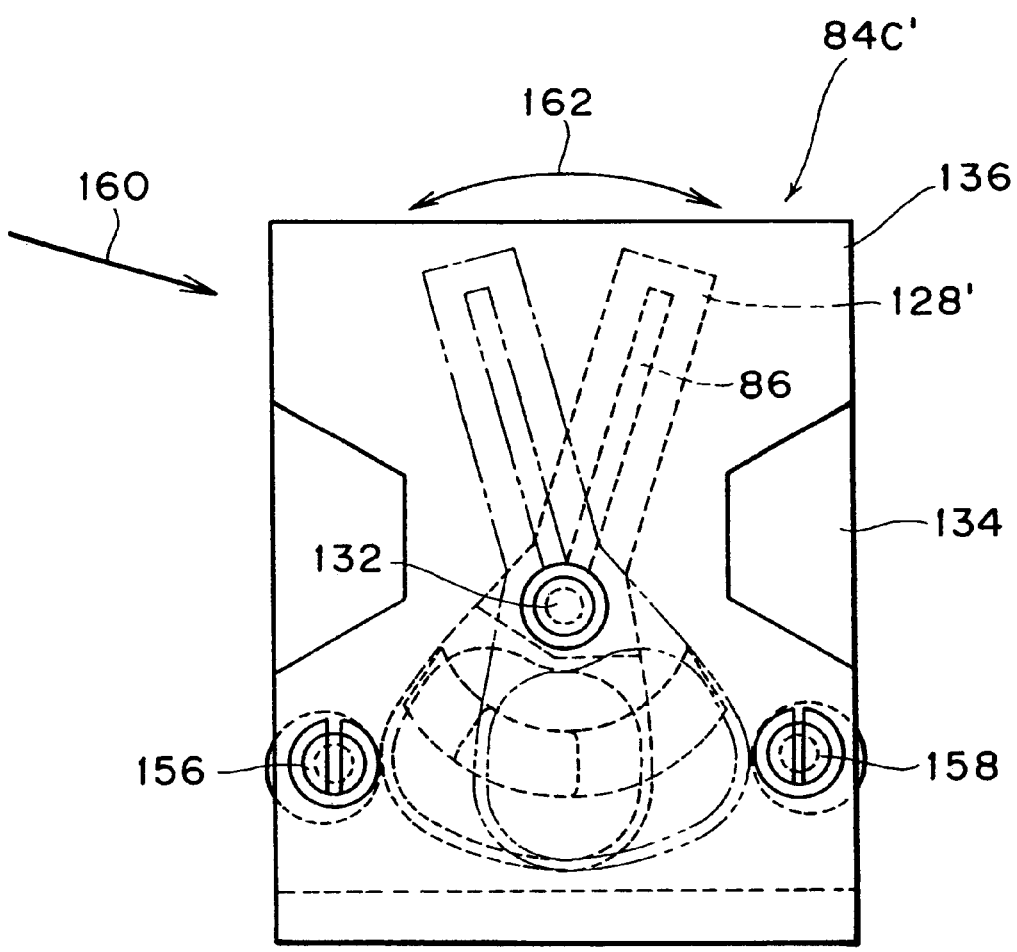
FIG. 28 is a view similar to FIG. 24, showing a modification of the third preferred embodiment.
Figure 29:
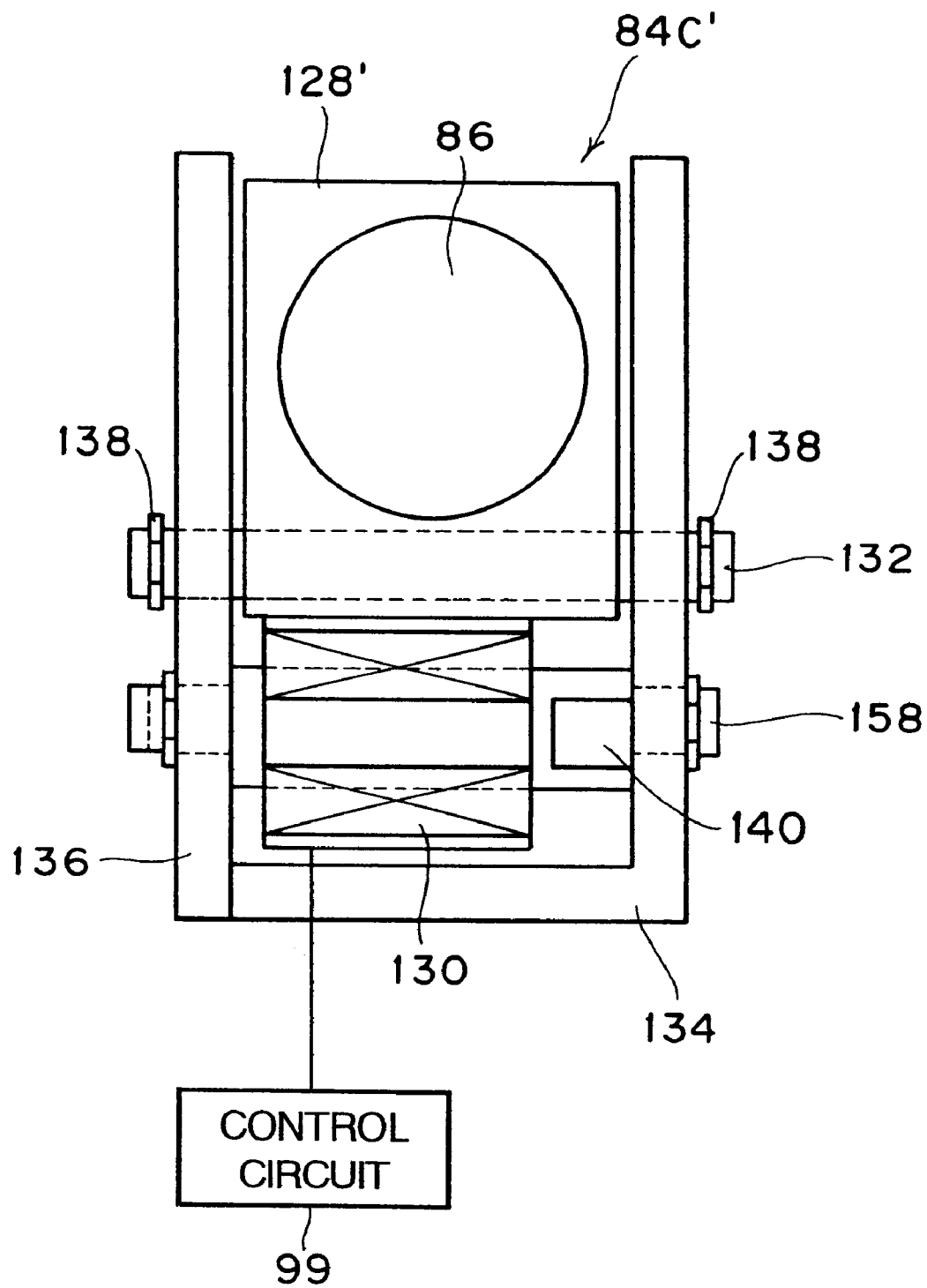
FIG. 29 is a right side view of the phase compensation unit shown in FIG. 28.

FIG. 28 is an elevational view of a modification 84C' of the phase compensation unit according to the third preferred embodiment, and FIG. 29 is a right side view of FIG. 28. In this modification, the phase plate 86 is mounted in a housing 128' formed of resin so as not to be tilted with respect to the housing 128'. A pair of stoppers 156 and 158 for making abutment against the housing 128' are rotatably supported to the frames 134 and 136 at their lower portions so as to extend therebetween. The phase compensation unit 84C' may be mounted in the phase compensation unit mounting space 60 shown in FIG. 8 so that when the housing 128' abuts against the stopper 156, the phase plate 86 is substantially perpendicular to the optical path of the reflected light beam shown by an arrow 160 in FIG. 28. By passing a current through the coil 130, the phase plate 86 can be tilted in the opposite directions shown by a double-headed arrow 162 in FIG. 28.

In each of the first to third preferred embodiments mentioned above, there is provided a phase compensation unit having a phase plate, a switching mechanism, and an adjusting mechanism. Accordingly, the present invention is applicable not only to a 3.5-inch magneto-optical disk drive, but also to any other land/groove recording/reproducing device such as a 5-inch magneto-optical disk drive and a digital video disk drive (DVD).

According to the present invention as described above, optimum phase compensation amounts for land track reading and groove track reading can be provided by a relatively simple and inexpensive optical system, thereby improving the quality of a reproduced signal.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An optical information storage device for directing an incident light beam onto a recording medium having a recording surface composed of lands and grooves as tracks and detecting a reproduced signal from a reflected light beam from said recording medium, comprising:

a phase plate provided in an optical path of said reflected light beam so as to be tiltable between a first position where said phase plate gives to said reflected light beam a first phase compensation amount required for detection of signals from said lands and a second position where said phase plate gives to said reflected light beam a second phase compensation amount required for detection of signals from said grooves;

a driver for tilting said phase plate;

a first stopper which stops said phase plate at said first position when said phase plate is tilted by said driver; and a second stopper which stops said phase plate at said second position when said phase plate is tilted by said driver.

2. An optical information storage device according to claim 1, further comprising control means for supplying a first control signal to said drive means to tilt said phase plate to said first position when said lands are selected as said tracks, and for supplying a second control signal to said driver to tilt said phase plate to said second position when said grooves are selected as said tracks.

3. An optical information storage device according to claim 2, further comprising:

a fixed frame on which said driver is mounted; and a housing pivotably mounted to said fixed frame, said phase plate being fixed to said housing;

said driver comprising:
a plunger having one end engaged with said housing;
a solenoid mounted on said fixed frame for pulling said plunger; and
a coil spring mounted on said plunger for biasing said plunger in its projecting direction.

4. An optical information storage device according to claim 3, wherein said first stopper is adjustably mounted on said fixed frame for stopping said phase plate at said first position; and said second stopper is adjustably mounted on said fixed frame for stopping said phase plate at said second position.

5. An optical information storage device according to claim 4, wherein said first stopper is adjusted so as to obtain said first phase compensation amount, and said second stopper is adjusted so as to obtain said second phase compensation amount.

6. An optical information storage device according to claim 2, further comprising a housing to which said phase plate is fixed;

said driver comprising a motor having an output shaft, said housing being fixed to said output shaft of said motor.

7. An optical information storage device according to claim 6, further comprising:

a magnet mounted on one of said housing and said motor; and a Hall element mounted on the other of said housing and said motor;

wherein when said Hall element detects said magnet, said control means supplies a third control signal to said driver to stop said phase plate at a third position between said first position and said second position.

8. An optical information storage device according to claim 7, wherein said phase plate gives a zero phase compensation amount to said reflected light beam at one of said first to third positions.

9. An optical information storage device according to claim 6, wherein said first stopper is fixed to said motor for stopping said phase plate at said first position; and said second stopper is fixed to said motor for stopping said phase plate at said second position.

10. An optical information storage device according to claim 2, further comprising:

a fixed frame formed of a magnetic material; and a housing pivotably mounted to said fixed frame, said phase plate being fixed to said housing;

said driver comprising a voice coil motor having a permanent magnet mounted on said fixed frame and a coil mounted in said housing.

11. An optical information storage device according to claim 10, wherein said first stopper is adjustably mounted on said fixed frame for stopping said phase plate at said first position; and said second stopper is adjustably mounted on said fixed frame for stopping said phase plate at said second position.

12. An optical information storage device for directing an incident light beam onto a recording medium having a recording surface composed of lands and grooves as tracks and detecting a reproduced signal from a reflected light beam from said recording medium, comprising:

a housing having a base;

a light source mounted on said base;

an optical head having an objective lens for focusing an incident light beam emitted from said light source onto said recording surface of said optical recording medium;

a photodetector mounted on said base for detecting a reproduced signal from a reflected light beam from said optical recording medium;

a phase plate provided in an optical path of said reflected light beam so as to be tiltable between a first position where said phase plate gives to said reflected light beam a first phase compensation amount required for detection of signals from said lands and a second position where said phase plate gives to said reflected light beam a second phase compensation amount required for detection of signals from said grooves;

a driver for tilting said phase plate;

a first stopper which stops said phase plate at said first position when said phase plate is tilted by said driver; and a second stopper which stops said phase plate at said second position when said phase plate is tilted by said driver.

13. An optical information storage device according to claim 12, further comprising control means for supplying a first control signal to said driver to tilt said phase plate to said first position when said lands are selected as said tracks, and for supplying a second control signal to said driver to tilt said phase plate to said second position when said grooves are selected as said tracks.

14. An optical information storage device according to claim 13, further comprising:

a fixed frame on which said drive means is mounted; and a housing pivotably mounted to said fixed frame, said phase plate being fixed to said housing;

said driver comprising:
a plunger having one end engaged with said housing;
a solenoid mounted on said fixed frame for pulling said plunger; and
a coil spring mounted on said plunger for biasing said plunger in its projecting direction.

15. An optical information storage device according to claim 13, further comprising a housing to which said phase plate is fixed;

said driver comprising a motor having an output shaft, said housing being fixed to said output shaft of said motor.

16. An optical information storage device according to claim 15, further comprising:

a magnet mounted on one of said housing and said motor; and a Hall element mounted on the other of said housing and said motor;

wherein when said Hall element detects said magnet, said control means supplies a third control signal to said driver to stop said phase plate at a third position between said first position and said second position.

17. An optical information storage device according to claim 13, further comprising:

a fixed frame formed of a magnetic material; and a housing pivotably mounted to said fixed frame, said phase plate being fixed to said housing;

said driver comprising a voice coil motor having a permanent magnet mounted on said fixed frame and a coil mounted in said housing.

* * * * *